United States Patent
Nam et al.

(10) Patent No.: US 9,935,298 B2
(45) Date of Patent: Apr. 3, 2018

(54) BATTERY CELL CASE HAVING FRONT CASE PLATE SEATED INTO REAR CASE PLATE

(71) Applicant: Global Battery Co., Ltd., Seoul (KR)

(72) Inventors: Gueng Hyun Nam, Gwangju (KR); Seok Ho Kim, Gwangju (KR); Min Ho Jang, Gwangju (KR); Dae Ung Kim, Gwangju (KR)

(73) Assignee: Global Battery Co., Ltd., Seoul (KR)

( * ) Notice: Subject to any disclaimer, the term of this patent is extended or adjusted under 35 U.S.C. 154(b) by 119 days.

(21) Appl. No.: 14/849,285

(22) Filed: Sep. 9, 2015

(65) Prior Publication Data
US 2015/0380690 A1    Dec. 31, 2015

Related U.S. Application Data

(62) Division of application No. 13/526,623, filed on Jun. 19, 2012, now Pat. No. 9,240,579.

(30) Foreign Application Priority Data

Feb. 23, 2012 (KR) .......................... 10-2012-0018318
Feb. 23, 2012 (KR) .......................... 10-2012-0018417

(51) Int. Cl.
| H01M 2/02 | (2006.01) |
| H01M 2/10 | (2006.01) |
| H01M 10/6551 | (2014.01) |
| H01M 10/613 | (2014.01) |

(52) U.S. Cl.
CPC ........... *H01M 2/021* (2013.01); *H01M 2/024* (2013.01); *H01M 2/1061* (2013.01); *H01M 10/613* (2015.04); *H01M 10/6551* (2015.04)

(58) Field of Classification Search
None
See application file for complete search history.

(56) References Cited

U.S. PATENT DOCUMENTS

| 2006/0244416 A1* | 11/2006 | Yong | .................. H01M 2/0215 320/112 |
| 2011/0059345 A1* | 3/2011 | Kim | .................. H01M 2/0212 429/120 |
| 2012/0106015 A1* | 5/2012 | Kwak | .................. H01M 2/0207 361/103 |

* cited by examiner

*Primary Examiner* — Ula C Ruddock
*Assistant Examiner* — Tony S Chuo
(74) *Attorney, Agent, or Firm* — The PL Law Group, PLLC

(57) ABSTRACT

Disclosed herein is a battery cell case. The battery cell case includes a front case plate and a rear case plate which are separably coupled to each other. The structures of the front and rear case plates are symmetrical structures, so that the battery cell case can be easily assembled in such a way that the front and rear case plates are coupled to each other with the battery cell disposed therebetween and are fastened to each other by holders fitted over the opposite ends of the case plates. In another embodiment, the structures of the front and rear case plates may be asymmetrical structures so that the front and rear case plates can be coupled with each other in an insert coupling manner without using a separate tool or fastening means.

12 Claims, 15 Drawing Sheets

BATTERY CELL CASE HAVING FRONT CASE PLATE SEATED INTO REAR CASE PLATE

CROSS-REFERENCE TO RELATED APPLICATION AND CLAIM OF PRIORITY

This application is a divisional application of application Ser. No. 13/526,623, filed on Jun. 9, 2012, now U.S. Pat. No. 9,240,579, issued on Jan. 19, 2016, which claims priority to Korean Patent Application Nos. 10-2012-0018318, filed on Feb. 23, 2012, and 10-2012-0018417, filed on Feb. 23, 2012, which are incorporated herein by reference in their entirety.

BACKGROUND

1. Field of the Invention

The present invention relates generally to battery cell cases and, more particularly, to a battery cell case in which a front case plate and a rear case plate are separably coupled to each other on opposite sides of a battery cell, and the structures of the front and rear case plates are symmetrical structures, so that the battery cell case can be easily assembled in such a way that the front and rear case plates are coupled to each other with the battery cell disposed therebetween and are fastened to each other by holders fitted over the opposite ends of the case plates, or in which a front case plate and a rear case plate are separably coupled to each other on opposite sides of a battery cell, and the structures of the front and rear case plates are asymmetrical structures so that the front and rear case plates can be coupled with each other in an insert coupling manner without using a separate tool or fastening means.

2. Description of the Related Art

Secondary batteries are batteries which are designed to be recharged and used multiple times, unlike primary batteries. Recently, a lot of research into such secondary batteries is being conducted along with development of high technology fields related to, for example, digital cameras, cellular phones, notebook computers, hybrid vehicles, etc. Nickel-cadmium batteries, nickel-metal hydride batteries, lithium secondary batteries, etc. are representative examples of the secondary batteries. Among such examples, the operating voltage of the lithium secondary batteries (hereinafter, referred to as 'lithium batteries') ranges from 2.0 V to 4.2 V or may be higher. Such a lithium battery may be typically used as a power supply for mobile electronic devices, or a plurality of lithium batteries may be connected in series to each other and used in a high power hybrid vehicle. The operating voltage of the lithium batteries is three times greater than that of nickel-cadmium batteries or nickel-metal hydride batteries. The energy density per unit weight of the lithium batteries is also comparatively high. Therefore, the use of the lithium batteries is rapidly increasing.

Such a lithium battery includes a cell which includes battery tabs through which power is input or output, and a case which houses the cell. Here, the cell that is housed in the case is called a battery cell unit.

The battery cell unit includes a pouch type cell and a battery cell case. The battery cell case includes a front case plate and a rear case plate which are disposed on front and rear surfaces of the cell and are separably coupled to each other to protect the cell.

In conventional battery cell cases, a front case plate and a rear case plate are made of metal or adiabatic plastic and are coupled to each other while in close contact with the front and rear surface of a battery cell. The structures of the front and rear case plates are asymmetrical with each other. The fronts and rear case plates are fastened to each other by screws or bolts after having been put in close contact with each other.

As such in the case of the conventional battery cell cases, the process of fastening the front case plate to the rear case plate includes inserting bolts or screws into the front and rear case plates and tightening the bolts or screws using a tool, such as a screwdriver or wrench. Therefore, the working time required to assemble the battery cell case is increased, thus reducing productivity.

SUMMARY OF THE INVENTION

Accordingly, the present invention has been made keeping in mind the above problems occurring in the prior art, and an object of the present invention is to provide a battery cell case having holders in which a front case plate and a rear case plate are separably coupled to each other on opposite sides of a battery cell, and the structures of the front and rear case plates are symmetrical structures that correspond to each other, so that the battery cell case can be assembled without using a separate fastening means.

Another object of the present invention is to provide a battery cell case using an asymmetrical structure in which a front case plate and a rear case plate that are separably coupled to each other on opposite sides of a battery cell have asymmetrical structures so that the front and rear case plates can be coupled with each other in an insert coupling manner, thus making it possible to assemble the battery cell case without using a separate tool or fastening means.

In order to accomplish the above object, in an aspect, the present invention provides a battery cell case, including: a pouch type battery cell, with battery tabs provided on an upper end of the battery cell at positions spaced apart from each other so that different poles of powers are input into or output from the battery cell via the battery tabs; a front case plate and a rear case plate respectively disposed on a front surface and a rear surface of the battery cell, the front and rear case plates being removably coupled to each other; and a pair of holders respectively fitted over opposite ends of the front and rear case plates that are coupled to each other on the opposite front and rear surfaces of the battery cell, wherein the front case plate includes front insert ends extending from the respective opposite ends of the front case plate, and the rear case plate includes rear insert ends extending from the respective opposite ends of the rear case plate, and each of the holders including a receiving body having a hollow space into which the corresponding front and rear insert ends that are coupled to each other are inserted.

The receiving body may have locking holes formed in an outer surface of the receiving body. Each of the front and rear case plates may include at least one holder locking protrusion extending in a direction toward the associated holder. The holder locking protrusion has a hook on an end thereof, whereby when the front and rear case plates are inserted into the receiving body, the hooks of the holder locking protrusions are locked to the corresponding locking holes.

Each of the front and rear case plates may include: a fastening protrusion protruding from a surface that faces the battery cell; and a fastening rod protruding from the surface that faces the battery cell, with a hole formed in the fastening rod, wherein structures of the front and rear case plates are symmetrical with each other such that the fastening protrusion of the front and rear case plates are fitted into the holes of the corresponding fastening rods.

The front case plate may include: at least one first heat dissipation window formed through a surface that faces the battery cell; and at least one front partition protruding from the surface that faces the battery cell, the front partition pressurizing a frame part of the battery cell, the frame part extending from a perimeter of a main body of the battery cell in which power is charged. The rear case plate may include: a second heat dissipation window formed at a position corresponding to the first heat dissipation window; and a rear partition provided at a position corresponding to the front partition, whereby a heat dissipation passage is formed by a space between the front case plate and the rear case plate so that heat generated from the battery cell is dissipated through the heat dissipation passage.

Each of the front and rear insert ends may include: at least one coupling protrusion protruding from each of the front and rear insert ends towards the opposing front or rear insert end; and at least one coupling depression formed in each of the front and rear insert ends at a position spaced apart from the coupling protrusion in a vertical direction by a predetermined distance, the coupling depression being disposed at a position corresponding to the coupling protrusion of the opposing front or rear insert end.

Each of the holders may further include at least one holder heat dissipation hole formed in the receiving body to dissipate heat generated from the battery cell.

Each of the holders may include: a connection bar guide having opposite side surfaces bent such that edges of the opposite side surfaces are oriented towards the battery cell, an edge of one of the opposite side surfaces of the connection bar guide being fixed to a surface of the receiving body, with at least one locking hole formed in a surface connecting the opposite side surface to each other; and a connection bar provided on the surface of the receiving body at a position spaced apart from the connection bar guide, the connection bar extending a predetermined length in the vertical direction, with a locking hook provided on the connection bar at a position corresponding to the locking hole of the connection bar guide.

Each of the holders may further include a circuit board support protrusion protruding upwards from an upper end of the receiving body to support a circuit board disposed above the battery cell case.

In another aspect, the present invention provides a battery cell case, including: a battery cell, with battery tabs provided on an upper end of the battery cell at positions spaced apart from each other so that different poles of powers are input into or output from the battery cell via the battery tabs; and a front case plate and a rear case plate respectively disposed on a front surface and a rear surface of the battery cell, the front and rear case plates being removably coupled to each other, wherein the front case plate includes: first horizontal frames respectively provided on upper and lower ends of the to front case plate, each of the first horizontal frames extending in a horizontal direction and forming a horizontal surface; and first vertical side frames forming upright surfaces extending in a vertical direction between opposite ends of the first horizontal frames, and the rear case plate includes: second horizontal frames respectively provided on upper and lower ends of the rear case plate, each of the second horizontal frames extending in a horizontal direction and forming a horizontal surface; and second vertical side frames forming upright surfaces extending in a vertical direction between opposite ends of the first horizontal frames, wherein when the front case plate is seated into an inner surface of the rear case plate, outer surfaces of the first horizontal frames are brought into close contact with inner surfaces of the corresponding second horizontal frames, and outer surfaces of the first vertical side frames are brought into close contact with inner surfaces of the corresponding second vertical side frames such that the front case plate is fitted into the rear case plate.

The front case plate may have at least one first locking depression formed in the first horizontal frame that is provided on the upper end of the front case plate. The rear case plate may include a locking member provided in the second horizontal frame that is provided on the upper end of the rear case plate, and the locking member may have a hook on a lower surface thereof so that the hook of the locking member is locked to the first locking depression.

The front case plate may further include at least one second locking depression formed in the first horizontal frame that is provided on the lower end of the front case plate and extends in the horizontal direction. The rear case plate may further include a lower stopper protruding upwards from the horizontal surface of the second horizontal frame that is provided on the lower end of the rear case plate and extends in the horizontal direction, the lower stopper being locked into the second locking depression.

The first vertical side frames and the second vertical side frames may have stepped portions having shapes aligned with each other and extending in the vertical direction.

The locking member may include a horizontal surface and a vertical surface each of which is separated at an opposite side edge thereof from the front case plate, wherein a proximal end of the vertical surface extends from the front case plate.

The front case plate may include: a front plate body having a planar inner surface with which the battery cell is brought into close contact, and an outer surface on which the first horizontal frames and the first vertical frames are provided; a first heat dissipation window formed through the front plate body to dissipate heat generated from the battery cell; a first support bar provided in the first heat dissipation window and extending in the vertical direction; and first tab guides protruding upwards from an upper surface of the first horizontal frame that is provided on the upper end of the rear case plate, the first tab guides guiding the corresponding battery tabs of the battery cells.

The rear case plate may include a rear plate body having a planar inner surface with which the battery cell is brought into close contact, with the second horizontal frames and the second vertical frames provided on the inner surface of the rear plate body; a second heat dissipation window formed through the rear plate body to dissipate heat generated from the battery cell; a second support bar provided in the second heat dissipation window and extending in the vertical direction; and second tab guides protruding upwards from an upper surface of the second horizontal frame that is provided on the upper end of the rear case plate, the second tab guides guiding the corresponding battery tabs of the battery cells.

Each of the second tab guides may include: a guide insert depression formed in the second horizontal frame that is provided on the upper end of the rear case plate, the guide insert depression having a width corresponding to a width of the corresponding first tab guide; and a guide plate protruding upwards from a portion of the upper surface of the second horizontal frame that surrounds the guide insert depression.

Opposite ends of the guide plate may be bent around the guide insert depression.

The front case plate may further include a first partition provided on each of opposite ends of the outer surface of the battery cell that is not brought into contact with the battery cell, the first partition extending a predetermined length in the vertical direction and having a stepped portion aligned with the stepped portion of the corresponding first vertical side frame.

The rear case plate may further include a rear partition provided on each of opposite ends of the outer surface of the battery cell that is not brought into contact with the battery cell, the rear partition extending a predetermined length in the vertical direction and having a stepped portion aligned with the stepped portion of the corresponding second vertical side frame.

The rear case plate may further include a circuit board support protrusion protruding upwards from the upper end of the rear case plate to support a circuit board.

The rear case plate may include: an insert hook unit having a pair of support plates provided on an outer surface of each of the second vertical side frames at positions spaced apart from each other with respect to the vertical direction by a predetermined distance, and a locking hook provided on an upper or lower surface of each of the support plates; and a catch unit having a support bar provided on the outer surface of each of the second vertical side frames, the support bar extending in the vertical direction, a first block protruding from an upper end of the support bar and having a planar surface on a lower end thereof, a second block protruding from a lower end of the support bar and having a planar surface on an upper end thereof, and a locking depression formed in the planar surface of each of the first and second blocks.

In the present invention, a front case plate and a rear case plate have structures symmetrical with each other so that the battery cell case can be easily assembled by coupling the front and rear case plates to each other using holders. Therefore, the present invention can reduce the number of assembly processes and the working time, thus enhancing the productivity.

Furthermore, the present invention may be configured such that a front case plate and a rear case plate that protect a battery cell have symmetrical structures and are coupled to each other in an insert coupling manner. In this case, the size of the battery cell case can be reduced. Moreover, the size of a battery module that is formed by connecting several battery cell cases in series and/or parallel to each other can also be made smaller.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Hereinafter, embodiments of a battery cell case according to the present invention will be described in detail with reference to the attached drawings.

Figure 1:
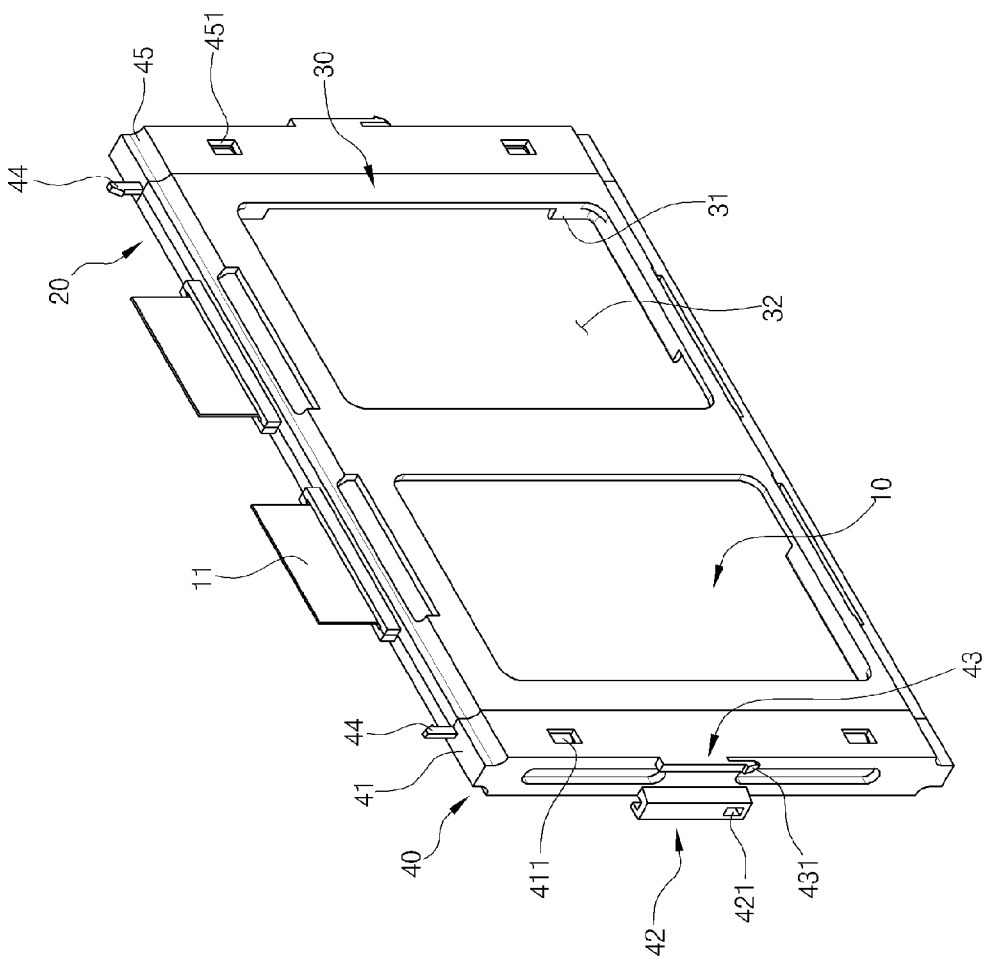
FIG. 1 is a perspective view illustrating a battery cell case, according to a first embodiment of the present invention.
Figure 2:
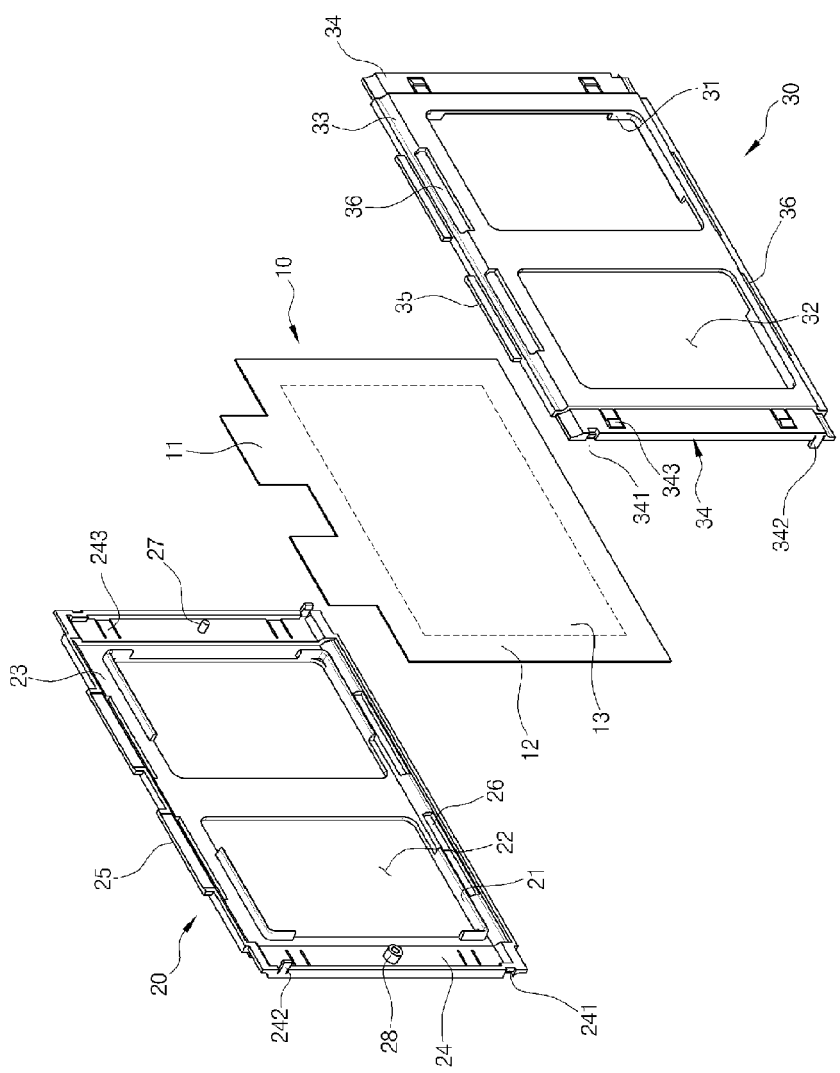
FIG. 2 is an exploded perspective view illustrating the battery cell case according to the first embodiment of the present invention.
Figure 3:
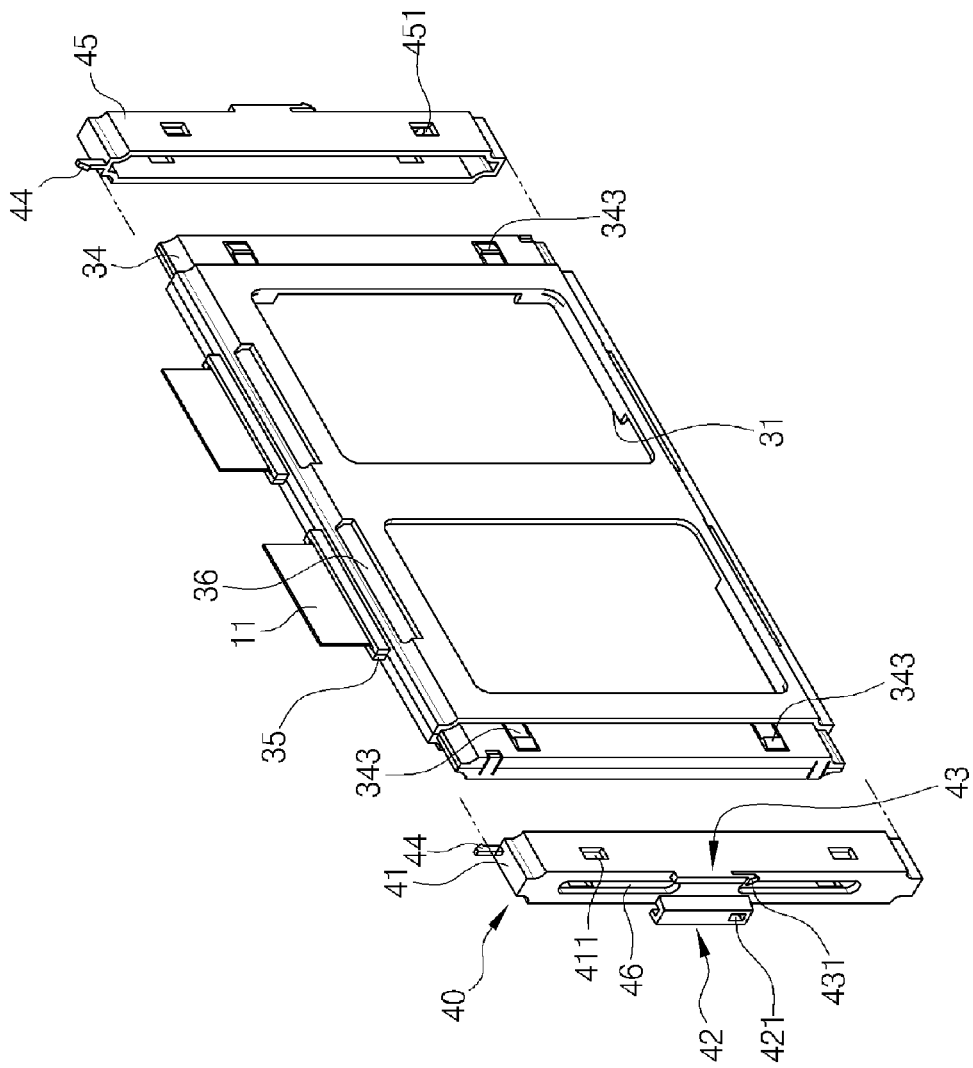
FIG. 3 is a view showing holders separated from the battery cell case according to the first embodiment of the present invention.

FIG. 1 is a perspective view illustrating the battery cell case, according to a first embodiment of the present invention. FIG. 2 is an exploded perspective view illustrating a battery cell and case plates of the battery cell case according to the first embodiment of the present invention. FIG. 3 is a view showing holders separated from the battery cell case according to the first embodiment of the present invention.

Referring to FIGS. 1 through 3, the battery cell case using holders 40 according to the first embodiment of the present invention includes a pouch type battery cell 10, a front case plate 20, a rear case plate 30 and the holders 40. The front case plate 20 and the rear case plate 30 are disposed at front and rear sides of the battery cell and are separably coupled to each other. The holders 40 are fitted over respective opposite ends of the front and rear case plates 20 and 30 that have been coupled to each other.

The battery cell 10 includes a frame part 12 and a battery charging part 13. The frame part 12 extends from the battery charging part 13 upwards, downwards, leftwards and rightwards, and the front case plate 20 and the rear case plate 30 are brought into close contact with the frame part 12. A pair of battery tabs 11 protrude upwards from the upper end of the frame part 12 at positions spaced apart from each other. The battery tabs 11 output different poles of power. The battery charging part 13 is charged with power.

The frame part 12 is a surface that extends from the battery charging part 13 upwards, downwards, leftwards and rightwards. The frame part 12 is brought into close contact with the front case plate 20 and the rear case plate 30 and is pressurized by them.

The front case plate 20 and the rear case plate 30 have structures symmetrical to each other and pressurize the frame part 12 of the battery cell 10, thus covering the front and rear sides of the battery cell 10.

In detail, the front case plate 20 includes a front partition 21, a first heat dissipation window 22, a front plate body 23, front insert ends 24, front tab guides 25, first heat dissipation slots 26, a first fastening protrusion 27 and a first fastening rod 28. The front partition 21 protrudes from a surface that faces the battery cell 10 so that the front partition 21 is brought into close contact with the frame part 12 of the battery cell 10. The first heat dissipation window 22 is formed in the front case plate 20 to dissipate heat. The front plate body 23 is a main body of the front case plate 20 and is coupled to the front surface of the battery cell 10. The front insert ends 24 extend from the opposite ends of the front plate body 23 outwards in the longitudinal direction and are coupled to the holders 40. The front tab guides 25 are provided on the upper end of the front plate body 23 at positions spaced apart from each other. The front tab guides 25 guide the corresponding battery tabs 11 of the battery cell 10. The first heat dissipation slots 26 are formed in the front plate body 23 above and below the first heat dissipation window 22 to dissipate heat generated from the battery cell 10. The first fastening protrusions 27 protrude from the surface of the front plate body 23 that faces the battery cell 10. The first fastening rod 28 is disposed at a position opposite to the first fastening protrusion 27 so that a second fastening protrusion of the rear case plate 30 is inserted into the first fastening rod 28.

The front plate body 23 is the main body of the front case plate 20 and is a plate that has inner and outer surfaces. The battery cell 10 is brought into close contact with the inner surface of the front case plate 10.

The first heat dissipation window 22 is an opening that is formed in the front plate body 23 and dissipates heat of the battery cell 10 to the outside. In this embodiment, at least one first heat dissipation window 22 is provided. The first heat dissipation window 22 may be formed in an area corresponding to the battery charging part 13 of the battery cell 10.

The front partition 21 protrudes from the front plate body 23 towards the battery cell 10 and extends a predetermined length along the edge of the first heat dissipation window 22. In this embodiment, the installation position of the front partition 21 may correspond to that of the frame part 12 of the battery cell 10. In more detail, one or more front partitions 21 are provided along the edge of the first heat dissipation window 22 and are brought into close contact with the frame part 12 of the battery cell 10.

As such, the front partitions 21 protrude from the front case plate 20 and support the battery cell 10 so that a predetermined space is defined between the front case plate 20 and the battery cell 10, thus forming a heat dissipation passage through which heat generated from the battery cell 10 is discharged to the outside.

The front tab guides 25 protrude from the front plate body 23 upwards and guide the battery tabs 11. Each of the front tab guides 25 is coupled to a corresponding rear tab guide 35 of the rear case plate 30 which will be described later, so that a through hole, through which the corresponding battery tab 11 protrudes outwards, is formed between the front and rear tab guides 25 and 35. To achieve this purpose, the front tab guide 25 is formed by a plate that protrudes upwards from a recess formed in a horizontal surface that forms the upper end of the front plate body 23.

One or more first heat dissipation slots 26 are formed at each of positions above and below the first heat dissipation window 22, thus dissipating heat generated from the battery cell 10.

A first fastening protrusion 27 protrudes from the front plate body 23 towards the battery cell 10 and is coupled to a second fastening rod (not shown) of the rear case plate 30 which will be explained later.

In the same manner, the first fastening rod 28 protrudes from the front plate body 23 towards the battery cell 10. As shown in the drawings, the first fastening rod 28 is disposed at a position spaced apart from the first fastening protrusion 27 with the first heat dissipation window 22 provided between it and the first fastening protrusion 27. The first fastening rod 28 is coupled to a second fastening protrusion (not shown) of the rear case plate 30.

In other words, the first fastening rod 28 is a cylindrical rod that protrudes from the inner surface of the front plate body 23 and has a hole into which the second fastening protrusion (not shown) is fitted. The first fastening rod 28 may be of different kinds of shapes besides a cylindrical shape, so long as it has a hole having a shape corresponding to the second fastening protrusion (not shown). These modifications must be regarded as falling within the bounds of the present invention.

In this embodiment, the first fastening protrusion 27 and the first fastening rod 28 are provided at positions spaced apart from each other with the first heat dissipation window 22 disposed therebetween. In an embodiment, the first fastening protrusion 27 and the first fastening rod 28 may be disposed on areas of the surface of the front case plate 20 that correspond to the front insert ends 24. In an embodiment, the battery charging part 13 of the battery cell 10 may have a predetermined length such that the battery charging part 13 can be in a range defined by the first heat dissipation window 22. In addition, the frame part 12 has a width which can contain an area corresponding to the positions of the front partitions 21. Therefore, the first fastening protrusion 27 and the first fastening rod 28 are disposed over the length of the battery cell 10 so that they can be coupled to the second fastening protrusion (not shown) and the second fastening rod (not shown) of the rear case plate 30 with the battery cell 10 disposed therebetween.

The front insert ends 24 extend from the opposite ends of the front plate body 23 outwards in the longitudinal direction. The length of each front insert end 24 is less than that of the front plate body 23, and a difference in length therebetween may be set such that the sum of the height of the front insert end 24 and the thickness of the holder 40 coincides with the height of the front plate body 23.

The front insert end 24 has at respective opposite ends thereof a first coupling protrusion 242 and a first coupling depression 241. The first coupling protrusion 242 protrudes from one end of the front insert end 24 in the direction of the battery cell 10. The first coupling depression 241 is formed in the other end of the front insert end 24 at a position spaced apart from the first coupling protrusion 242 so that a corresponding second coupling protrusion 342 of the rear case plate 30 is locked to the first coupling depression 241.

The first coupling protrusion 242 has a shape of a bar that protrudes from the front insert end 24 towards the rear case plate 30. A hook protrudes from the end of the first coupling protrusion 242 in either the left or right direction. Thereby, the first coupling protrusion 242 can be locked to the corresponding first coupling depression 241 of the rear case plate 30, thus coupling the front case plate 20 to the rear case plate 30.

In this embodiment, the first coupling protrusions 242 are respectively disposed at diagonal positions on the two front insert ends 24 that extend from the opposite ends of the front plate body 23. That is, if one first coupling protrusion 242 is disposed at an upper portion of the front insert end 24 that is provided on one end of the front plate body 23, the other first coupling protrusion 242 is disposed at a lower portion of the front insert end 24 that is provided on the other end of the front plate body 23.

The first coupling depression 241 is a depression which is formed in a predetermined portion of the front insert end 24 so that a corresponding second coupling protrusion 342 of the rear case plate 30 which will be explained later can be locked into the depression.

In the same manner as the locations of the first coupling protrusions 242, the first coupling depressions 241 are respectively formed at diagonal positions on the two front insert ends 24 that are provided on the opposite ends of the front plate body 23.

Each front insert end 24 further includes first holder locking protrusions 243 to which the corresponding holder 40 is removably locked. The first holder locking protrusions 243 are respectively provided on upper and lower portions of a surface of the front insert end 24 that opposes to the rear case plate 30.

Each first holder locking protrusion 243 extends at a proximal end thereof from the surface of the front insert end 24 in the shape of a bar whose upper, lower and distal ends are separated from the surface of the front insert end 24. A hook which is locked to the holder 40 is provided on an outer surface of the distal end of each first holder locking protrusion 243. As such, the proximal end of the first holder locking protrusion 243 is connected to the front insert end 24 while the other parts are separated from the front insert end 24. Thus, when force that has been applied to the first holder locking protrusion 243 to the left or right is removed therefrom, the first holder locking protrusion 243 is returned to its original position by the elasticity.

Although the shape of the first holder locking protrusion 243 of the front insert end 24 is not clearly shown in FIG. 2 because of the orientation of the front case plate 20 of FIG. 2, the shape of the first holder locking protrusion 243 may be the same as that of a holder locking protrusion 343 of the rear case plate 30, so it will be able to be clearly understood with reference to the holder locking protrusion 343 of the rear case plate 30.

The shape of the rear case plate 30 is symmetrical with that of the front case plate 20. In detail, the rear case plate 30 includes a rear plate body 33, a rear partition 31, a second heat dissipation window 32, rear insert ends 34, rear tab guides 35, second heat dissipation slots 36, a second fastening protrusion (not shown) and a second fastening rod (not shown). The rear plate body 33 is coupled to the rear surface of the battery cell 10. The rear partition 31 protrudes from a surface of the rear plate body 33 that faces the battery cell 10 so that the rear partition 31 is brought into close contact with the frame part 12 of the battery cell 10. The second heat dissipation window 32 is formed in the rear case plate 30 to dissipate heat. The rear insert ends 34 extend from the opposite ends of the rear plate body 33 outwards in the longitudinal direction and are coupled to the holders 40. The rear tab guides 35 are provided on the upper end of the rear plate body 33 at positions spaced apart from each other. The rear tab guides 35 guide the corresponding battery tabs 11 of the battery cell 10. The second heat dissipation slots 36 are formed in the rear plate body 33 above and below the second heat dissipation window 32 to dissipate heat generated from the battery cell 10. The second fastening protrusion (not shown) protrudes from the surface of the rear plate body 33 that faces the battery cell 10. The second fastening rod (not shown) is disposed at a position opposite to the second fastening protrusion (not shown) so that the first fastening protrusion 27 of the front case plate 20 is inserted into the second fastening rod. Although the second fastening protrusion and the second fastening rod are not shown in the drawings, they are respectively disposed at positions corresponding to the first fastening rod 28 and the first fastening protrusion 27 of the front plate body 23.

The rear plate body 33 is a main body of the rear case plate 30 and is a plate that has inner and outer surfaces. The rear plate body 33 is disposed on the rear surface of the battery cell 10 and is coupled to the front case plate 20 that is disposed on the front surface of the battery cell 10.

The second heat dissipation window 32 is formed in the rear plate body 33 to dissipate heat generated from the battery cell 10. In this embodiment, at least one second heat dissipation window 32 is provided. The second heat dissipation window 32 may be formed at a position corresponding to the body of the battery cell 10 and to have a size that can cover the body of the battery cell 10.

The rear partition 31 protrudes from the rear plate body 33 towards the battery cell 10 and extends a predetermined length along the edge of the second heat dissipation window 32. In this embodiment, the installation position of the rear partition 31 may correspond to that of the frame part 12 of the battery cell 10 so that the rear partition 31 can pressurize and support the rear surface of the frame part 12 of the battery cell 10. Because the rear partition 31 supports the frame part 12 of the battery cell 10, a predetermined space is defined between the rear case plate 30 and the battery cell 10, thus forming a heat dissipation passage.

The rear tab guides 35 are formed using a plate that protrudes upwards from a recess formed in a horizontal surface that forms the upper end of the rear plate body 33. The rear tab guides 35 function to guide the battery tabs 11. The shape of each rear tab guide 35 corresponds to that of the related front tab guide 25 so that a through hole, through which the corresponding battery tab 11 protrudes outwards, is formed between the front and rear tab guides 25 and 35.

One or more second heat dissipation slots 36 are formed in the rear plate body 33 above and below the second heat dissipation window 32, thus dissipating heat generated from the battery cell 10.

The rear insert ends 34 extend from the opposite ends of the rear plate body 33 outwards in the longitudinal direction. The rear insert ends 34 are coupled to the corresponding front insert ends 24, and the shape of each rear insert end 34 corresponds to that of the front insert end 24.

The shapes of the second fastening protrusion and the second fastening rod respectively correspond to those of the first fastening protrusion 27 and the first fastening rod 28, and further explanation and detailed illustration of them will be omitted.

Each rear insert end 34 has at respective opposite ends thereof a second coupling protrusion 342 and a second coupling depression 341. The second coupling protrusion 342 protrudes from one end of the rear insert end 34 in the direction toward the battery cell 10. The second coupling depression 341 is formed in the other end of the rear insert end 34 at a position spaced apart from the second coupling protrusion 342 so that the corresponding first coupling protrusion 242 of the front to case plate 20 is locked to the second coupling depression 341.

The second coupling protrusion 342 has a shape of a bar that protrudes from the rear insert end 34 towards the front case plate 20. A hook protrudes from the end of the first coupling protrusion 242 in sideways direction and has a shape corresponding to that of the first coupling depression

241. Although FIG. 2 illustrates the outer (rear) surface of the rear case plate 30 and thus cannot clearly show the second coupling protrusion 342, it is unnecessary to provide a separate drawing, because the shape of the second coupling protrusion 342 is the same as that of the first coupling protrusion 242.

The second coupling depression 341 is a depression which is formed in a predetermined portion of the rear insert end 34 so that the corresponding first coupling protrusion 242 of the front case plate 20 can be locked into the depression.

Each rear insert end 34 further includes second holder locking protrusions 343 to which the corresponding holder 40 is removably locked.

Each second holder locking protrusion 343 extends at a proximal end thereof from the rear insert end 34 in a shape of a bar in which upper, lower and distal ends thereof are separated from the surface of the rear insert end 34. A hook which is locked to the holder 40 is provided on an outer surface of the distal end of each second holder locking protrusion 343.

The holders 40 are fitted over the front insert ends 24 and the rear insert ends 34 of the front and rear case plates 20 and 30 that are coupled to each other, thus fastening the front and rear case plates 20 and 30 to each other. For this, the holders 40 include a first receiving body 41 and a second receiving body 45. Each of the first and second receiving bodies 41 and 45 has therein a hollow space into which the corresponding front insert end 24 and the associated rear insert end 34 are inserted. A connection bar guide 42 and a connection bar 43 are provided on each of the first and second receiving bodies 41 and 45 so that the battery cell case can be connected to another battery cell case by the connection bar guides 42 and the connection bars 43. Circuit board support protrusions 44 each of which has a triangular hook on the end thereof are provided on upper ends of the first and second receiving bodies 41 and 45 to support a circuit board (50, refer to FIG. 6). At least one heat dissipation hole 46 is formed in a surface of each of the first and second receiving bodies 41 and 45 to dissipate internal heat.

The first receiving body 41 has in one surface thereof an opening into which one end of the battery cell case including of the front and rear case plates 20 and 30 that are coupled to each other is inserted. The other three surfaces of the first receiving body 41 are closed surfaces. Locking holes 411 are formed at upper and lower positions in opposite side surfaces of the first receiving body 41 that are adjacent to the surface that has the opening into which the front insert end 24 and the rear insert end 34 are inserted.

The locking holes 411 are formed in the side surfaces of the first receiving body 41 that defines the internal space. The hooks of the first and second holder locking protrusions 243 and 343 which are inserted into the first receiving body 41 are locked to the corresponding locking holes 411.

The shape of the second receiving body 45 corresponds to that of the first receiving body 41. The second receiving body 45 is fitted over the other end of the battery cell case including the front and rear case plates 20 and 30 that are coupled to each other.

The circuit board support protrusions 44 protrude upwards from the respective upper ends of the first and second receiving bodies 41 and 45. The triangular hook is provided on each of the circuit board support protrusions 44. The circuit board support protrusions 44 support the circuit board (50, refer to FIG. 6) that is disposed above the battery cell 10.

In this embodiment, the circuit board support protrusions 44 are respectively provided on the first and second receiving bodies 41 and 45, and each of the circuit board support protrusions 44 may be used as it is or alternatively cut off as necessary.

As shown in the drawings, the triangular hook that is formed by a downwardly-inclined surface is provided on the end of each circuit board support protrusion 44 so that the circuit board is locked to the triangular hook and supported by the circuit board support protrusion 44. As another embodiment, the circuit board support protrusion may include two elastic rods which are spaced apart from each other and each of which has a downwardly-inclined surface on the end thereof, although this structure is not shown in the drawings. In this case, when the circuit board support protrusion 44 is inserted into a locking hole (not shown) of the circuit board 50, pressure is applied to the two elastic rods which are spaced apart from each other to bring them closer to each other while their downwardly-inclined surfaces are passing through the locking hole, and after the downwardly-inclined surfaces have passed through the locking hole, the elastic rods elastically move away from each other so that they are locked to a portion of the upper surface of the circuit board 50 that surrounds the locking hole, thus supporting the circuit board 50.

The connection bar guide 42 is provided on each of the first and second receiving bodies 41 and 45 and has a U-shaped cross-section. The connection bar guide 42 is open on one end thereof so that the connection bar 43 of another battery cell case is inserted into the connection bar guide 42. A locking hole 421, to which the connection bar 43 of another battery cell case is locked, is formed in the connection bar guide 42.

The edge of one of two opposite side surfaces of the connection bar guide 42 that faces the battery cell 10 is fastened to the surface of the first or second receiving body 41 or 45, and the other side surface thereof protrudes outwards. Thereby, a space is defined between the two side surfaces, and the corresponding connection bar 43 is inserted into the space. The locking hole is formed at a predetermined position in a surface of the connection bar guide 42 that connects the two opposite side surfaces thereof to each other.

The connection bar 43 is provided on the surface of each of the first and second receiving bodies 41 and 45 at a position that is spaced apart from the connection bar guide 42 and is adjacent to the rear case plate 30. The connection bar 43 extends a predetermined length in the vertical direction. A locking hook 431 protrudes from the connection bar 43 at a position corresponding to the locking hole 421 of the connection bar guide 42.

The connection bar 43 is inserted into the open side of the connection bar guide 42 that protrudes from another battery cell case. The locking hook 431 of the connection bar 43 is hooked to the locking hole of the connection bar guide 42, thus completing the coupling of the battery cell cases.

Figure 5:
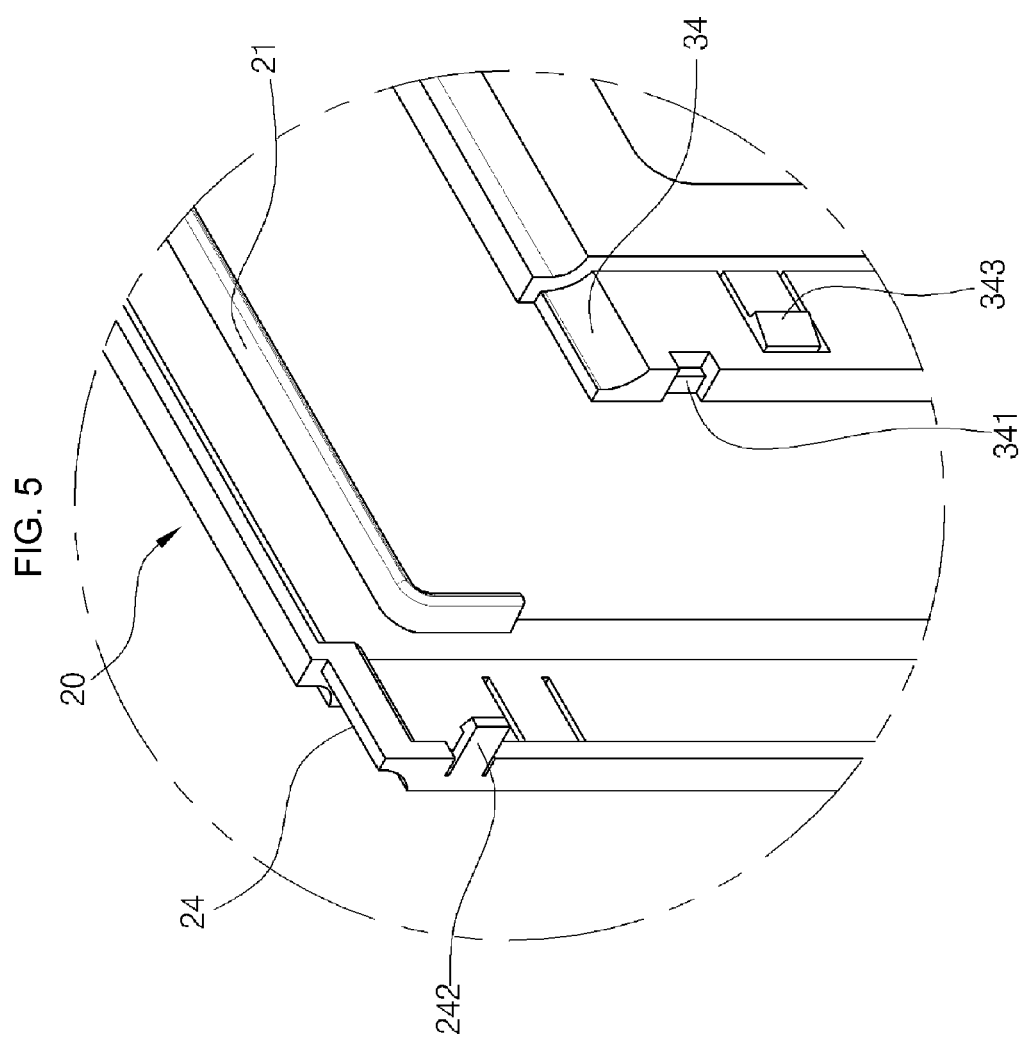
FIG. 5 is a partially enlarged perspective view showing a coupling structure of a holder of the battery cell case according to the first embodiment of the present invention.
Figure 6:
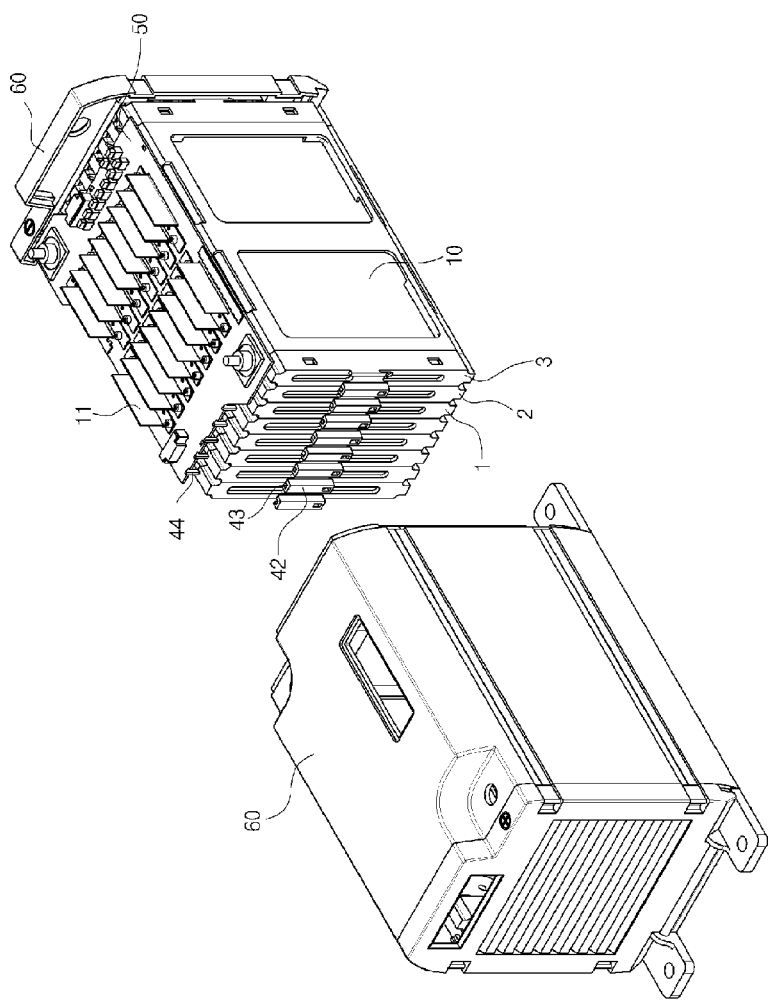
FIG. 6 is a perspective view showing a battery module having battery cell cases according to the first embodiment of the present invention.

Hereinafter, the operation of the battery cell case using the holders 40 according to the present invention having the above-mentioned construction will be described in detail with reference to FIGS. 4 through 6.

Figure 4:
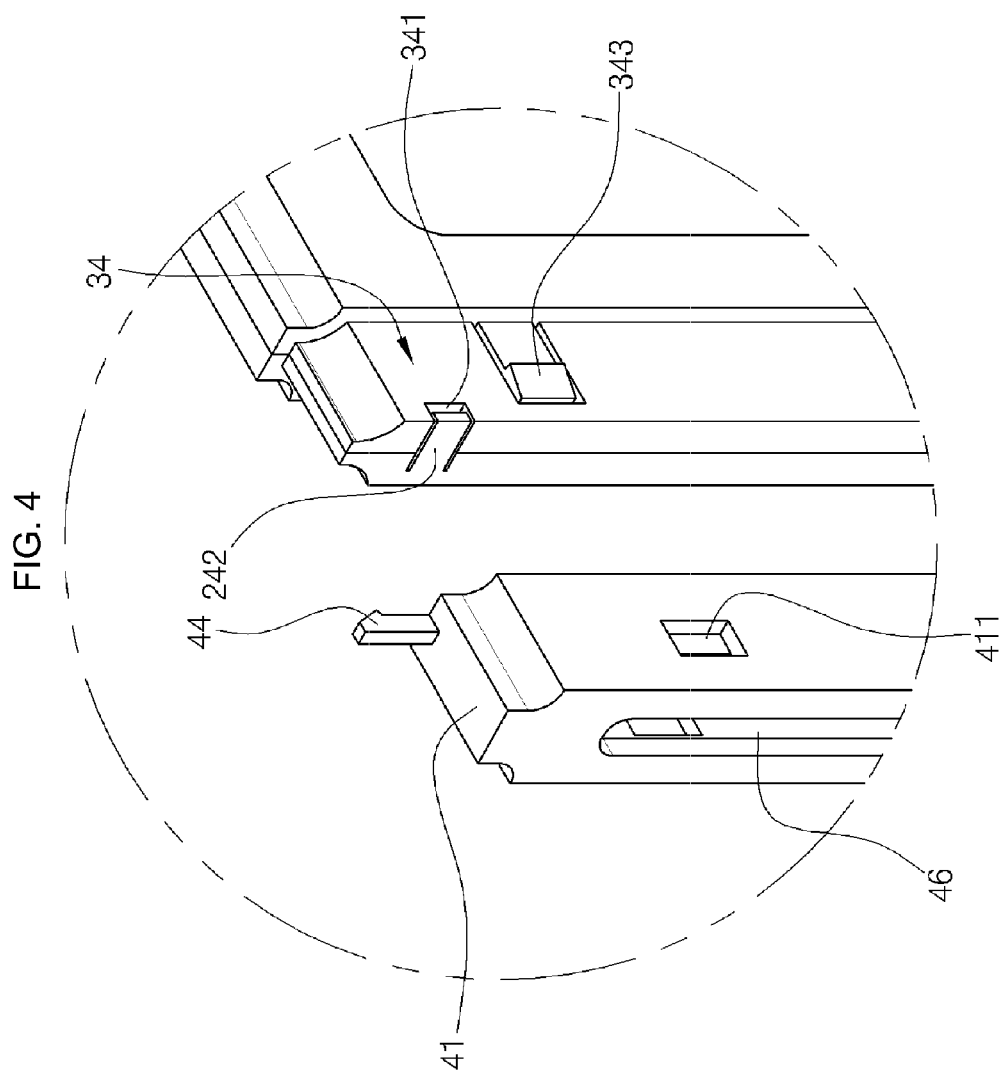
FIG. 4 is a partially enlarged perspective view showing a first coupling protrusion and a coupling depression of a front case and a rear case of the battery cell case according to the first embodiment of the present invention.

FIG. 4 is a partially enlarged perspective view showing the first coupling protrusion 242 and the second coupling depression 341 of the front case plate 20 and the rear case plate 30 of the battery cell case using the holders 40 according to an embodiment of the present invention. FIG. 5 is a partially enlarged perspective view showing the coupling structure of the holder 40 of the battery cell case according to an embodiment of the present invention. FIG. 6 is a perspective view showing a battery module having the battery cell cases using the holders 40 according to an embodiment of the present invention.

First, to assemble a single battery module, the front case plate 20 and the rear case plate 30 are respectively coupled to the front and rear surfaces of the battery cell 10. To achieve this, a worker disposes the front case plate 20 and the rear case plate 30 on the front and rear surfaces of the battery cell 10 and applies pressure to them to push them against each other.

Then, the front partition 21 of the front case plate 20 and the rear partition 31 of the rear case plate 30 are respectively brought into close contact with the front and rear surfaces of the frame part 12 that extends outwards from the outer edge of the battery charging part 13 of the battery cell 10. The first coupling protrusions 242 are locked into the corresponding second coupling depressions 341 of the rear case plate 30. The second coupling protrusions 342 of the rear case plate 30 are locked into the corresponding first coupling depression 241 of the front case plate 20.

Simultaneously, the first fastening protrusion 27 is fitted into the second fastening rod, and the second fastening protrusion is inserted into the first fastening rod 28.

The first coupling protrusion 242 and the second coupling protrusion 342 respectively protrude from the front insert end 24 and the rear insert end 34 rearwards and forwards, wherein upper and lower edges of the first and second coupling protrusions 242 and 342 are cut from proximal ends thereof to predetermined distances and separated from the front insert end 24 and the rear insert end 34, respectively. Thus, because the proximal end of each of the first and second coupling protrusions 242 and 342 is fixed to the corresponding plate-end part 24, 34 while the other portions are separated therefrom, the distal end of each of the first and second coupling protrusions 242 and 342 can be elastically moved. Therefore, the front case plate 20 and the rear case plate 30 can be easily coupled to each other by respectively aligning the first and second coupling protrusions 242 and 342 with the second coupling depressions 341 and the first coupling depressions 241 and by pressurizing the front and rear case plates 20 and 30 to each other.

Here, because the front partition 21 and the rear partition 31 pressurize the frame part 12 of the battery cell 10, the passage is defined between the front case plate 20 and the rear case plate 30 so that heat generated from the battery cell 10 can be discharged to the outside through the passage. The first heat dissipation window 22, the second heat dissipation window 32, the first heat dissipation slot 26 and the second heat dissipation slot 36 also function to dissipate heat generated from the battery cell 10, thus preventing the battery cell 10 from overheating.

After the front case plate 20 and the rear case plate 30 have been coupled to each other, the holders 40 are respectively fitted over the opposite ends of the front and rear case plates 20 and 30, thus reliably fastening the front and rear case plates 20 and 30 to each other.

That is, the first receiving body 41 is fitted over one end of the front and rear case plates 20 and 30, and the second receiving body 45 is fitted over the other end. At this time, the first and second holder locking protrusions 243 and 343 that are respectively provided on the surfaces of the front and rear case plates 20 and 30 are elastically rotated inwards while the first and second receiving bodies 41 and 45 are being fitted over the opposite ends of the front and rear case plates 20 and 30.

In detail, when the front insert ends 24 and the rear insert end 34 are inserted into the first and second receiving bodies 41 and 45, the first holder locking protrusions 243 and the second holder locking protrusions 343 are rotated inwards by the pressurization of the inner surfaces of the first and second receiving bodies 41 and 45, and then the hooks of the first and second holder locking protrusions 243 and 343 are elastically locked into the corresponding locking holes 411 and 451 of the first and second receiving bodies 41 and 45. Thereby, the front insert ends 24 and the rear insert ends 34 are fastened to the first and second receiving bodies 41 and 45.

On the other hand, to remove the first or second receiving body 41 or 45 from the front and rear case plates 20 and 30, the hooks of the first and second holder locking protrusions 243 and 343 that have been protruded from the first or second receiving body 41 or 45 are pushed inwards by a pointed substance, for example, a ball pen, pincers or the like. After the hooks of the first and second holder locking protrusions 243 and 343 have been released from the locking holes 411 or 451, the first or second receiving body 41 or 45 is subsequently pulled out of the front and rear case plates 20 and 30.

Several battery cells 10 each of which has been assembled by the above-mentioned method are elastically connected to each other, thus forming a battery module. The battery module is installed in a battery pack case 60. To achieve this, the connection bar guides 42 and the connection bar 43 which are provided on the opposite ends of each battery cell case are connected to the connection bars 43 and the connection bar guides 42 of adjacent battery cell cases, respectively.

In an embodiment, a first connection bar 43 of a first battery cell 1 is inserted into a second connection bar guide 42 of an adjacent second battery cell 2. A second connection bar 43 of the second battery cell 2 is inserted into a third connection bar guide 42 of a third battery cell 3. After several of the battery cells have been coupled to each other, the battery tabs 11 that protrude upwards from the upper ends of the battery cell cases are elastically connected to each other and are elastically connected to the circuit board 50. The battery cells are thereafter installed in the battery pack case 60.

Among the circuit board support protrusions 44 that protrude upwards from the upper ends of the battery cells, some circuit board support protrusions 44 of the first and second receiving bodies 41 and 45 may be cut off depending on the structure of shape of the circuit board 50. The remaining circuit board support protrusions 44 support the circuit board.

That is, the circuit board 50 can have different shapes depending on the size of the battery pack case that contains the battery module and whether locking holes are present. Therefore, the worker cuts off some of the circuit board support protrusions 44 that are provided on the first and second receiving bodies 41 and 45 or changes the shapes thereof to suit the shape the circuit board 50. The remaining circuit board support protrusions 44 may support the lower surface or edge of the circuit board 50, or if locking holes (not shown) that are present in the circuit board, the circuit board support protrusions 44 may be fitted into the corresponding locking holes (not shown), thus supporting the circuit board 50.

In an embodiment of the present invention, the battery cell case may be configured such that it is assembled using the symmetrical structure and the holders, as stated above. In a second embodiment, the battery cell case may be configured such that it is assembled using an asymmetrical depression structure. Hereinafter, the second embodiment of the battery cell case using the asymmetrical depression structure will be described in detail with reference to the attached drawings.

Figure 7:
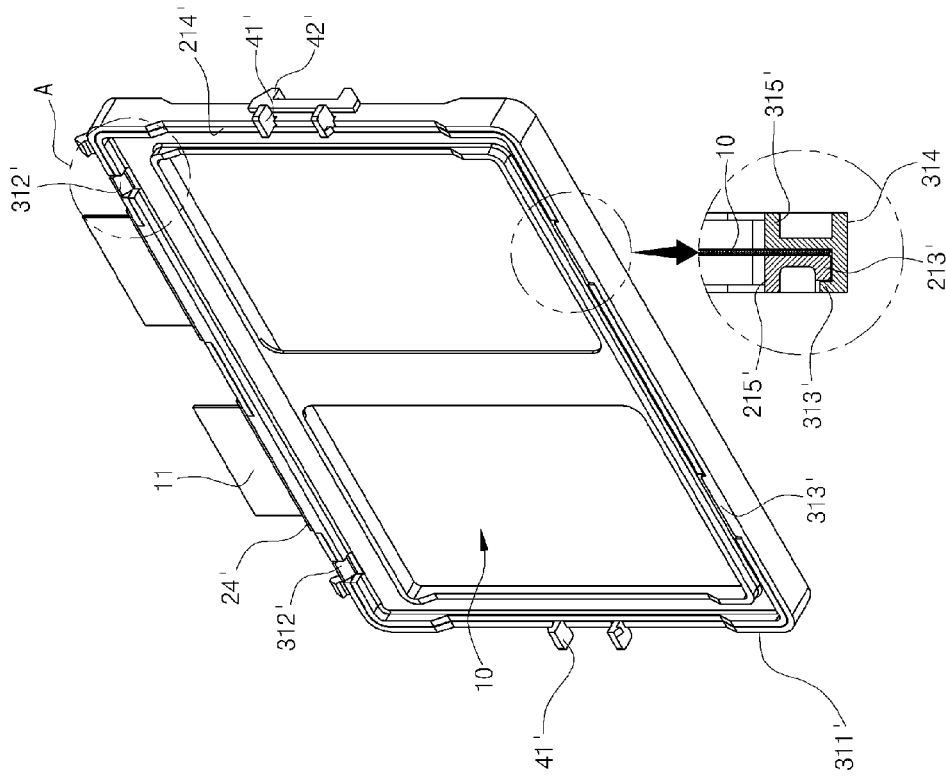
FIG. 7 is a perspective view illustrating a battery cell case, according to a second embodiment of the present invention.
Figure 8:
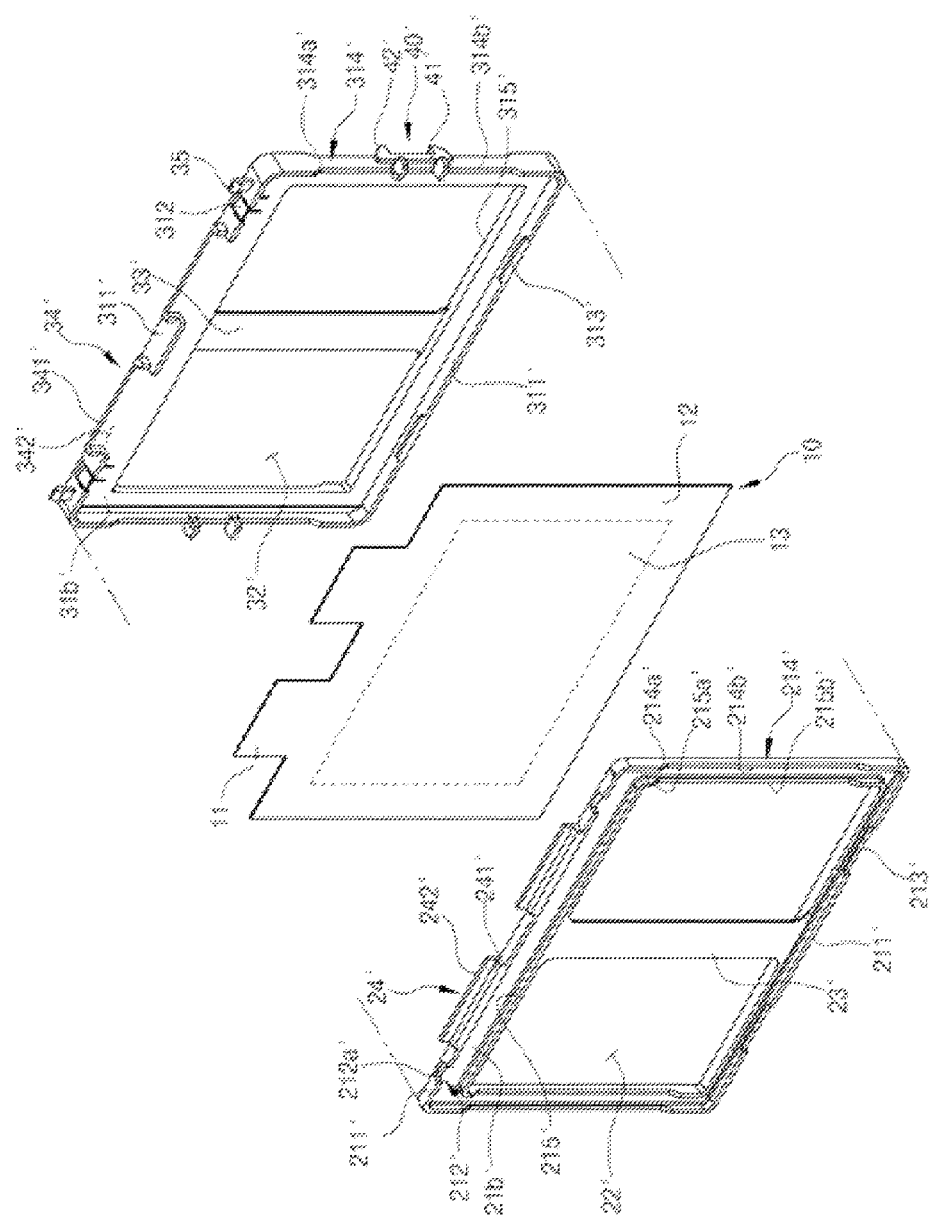
FIGS. 8 and 9 are exploded perspective views illustrating the battery cell case according to the second embodiment of the present invention.
Figure 9:
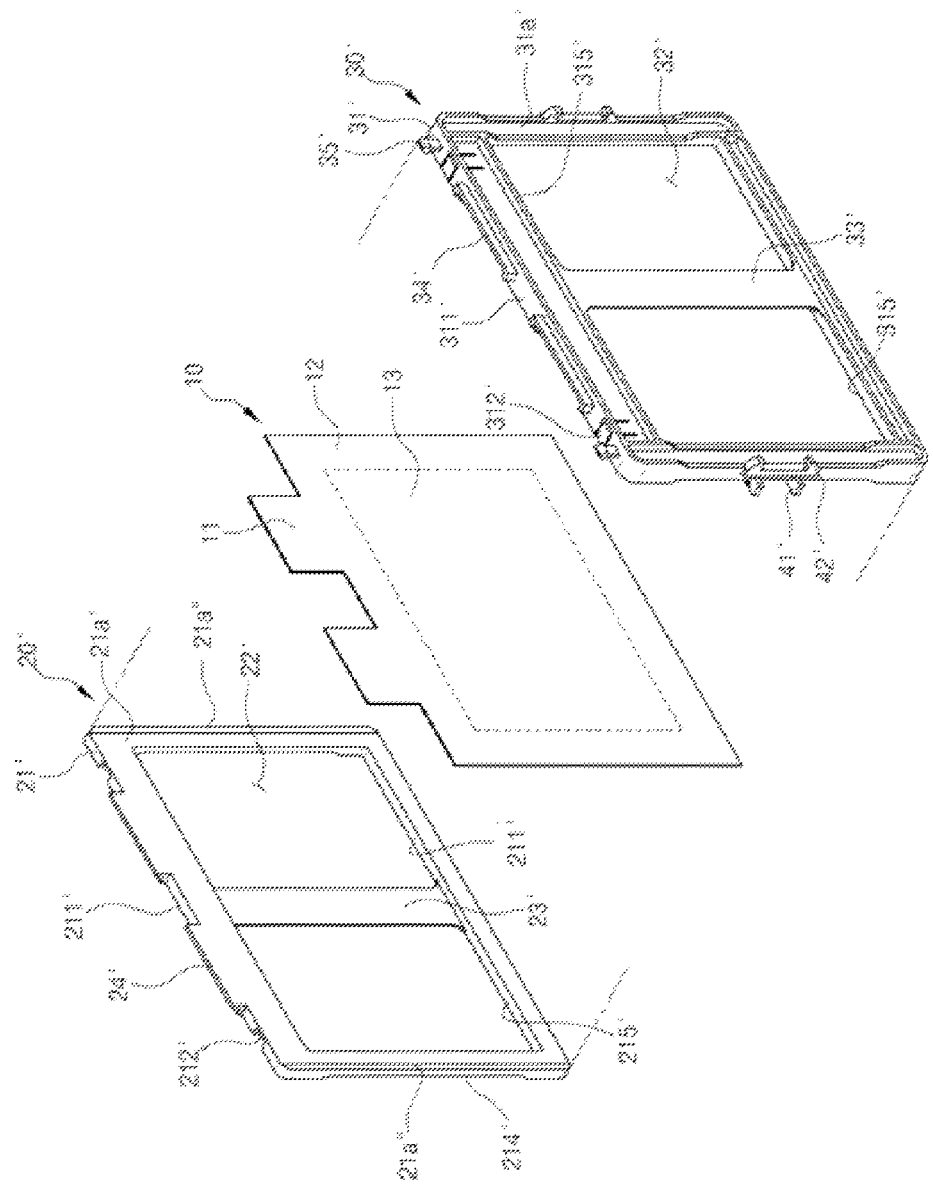

FIG. 7 is a perspective view illustrating a battery cell case, according to the second embodiment of the present invention. FIGS. 8 and 9 are exploded perspective views illustrating the battery cell case according to the second embodiment of the present invention. FIGS. 8 and 9 are the exploded perspective views showing the battery cell case from different directions.

Referring to FIGS. 7 and 9, the battery cell case according to the second embodiment of the present invention includes a front case plate 20' which is coupled to a front surface of a pouch type battery cell 10, and a rear case plate 30' which is disposed on a rear surface of the battery cell 10 and coupled to the front case plate 20'.

The battery cell 10 includes a frame part 12 and a battery charging part 13. The frame part 12 extends from the battery charging part 13 upwards, downwards, leftwards and rightwards, and the front case plate 20' and the rear case plate 30' are brought into close contact with the frame part 12. A pair of battery tabs 11 protrude upwards from the upper end of the the frame part 12 at positions spaced apart from each other. The battery tabs 11 output different powers. The battery charging part 13 is charged with power.

The frame part 12 is a surface that extends from the battery charging part 13 upwards, downwards, leftwards and rightwards. The frame part 12 is pressurized by the front case plate 20' and the rear case plate 30'.

The front case plate 20' and the rear case plate 30' have structures that are asymmetrical. The battery cell 10 is disposed between the front case plate 20' and the rear case plate 30', and an inner surface 21a' of the front case plate 20' is seated into an inner surface 31b' of the rear case plate 30'.

In detail, the front case plate 20' includes a front plate body 21', a first heat dissipation window 22', a first support bar 23' and first tab guides 24'. The front plate body 21' has the inner surface 21a' and an outer surface 21b' and is placed upright. The front plate body 21' pressurizes the frame part 12 of the battery cell 10 to support it. The first heat dissipation window 22' is formed in the front plate body 21' to dissipate heat generated from the battery cell 10. The first support bar 23' is provided upright in the first heat dissipation window 22' and is brought into contact with the front surface of the battery cell 10 to support it. The first tab guides 24' protrude upwards from the upper end of the front plate body 21' and support the corresponding battery tabs 11 of the battery cell 10.

The front plate body 21' includes first horizontal frames 211', first vertical side frames 214', first locking depressions 212' and second locking depressions 213'. The first horizontal frames 211' horizontally extend along upper and lower edges of the front plate body 21' and protrude in a direction away from the battery cell 10 to form horizontal plates. The first vertical side frames 214' vertically extend from the opposite ends of the first horizontal frames 211'. First locking depressions 212' and second locking depressions 213' are respectively formed in the upper and lower first horizontal frames 211'.

The inner surface 21a' of the front plate body 21' is a surface that is placed upright and is brought into close contact with the frame part 13 of the battery cell 10. The first horizontal frames 211' and the first vertical side frames 214' protrude from the upper, lower, left and right edges of the outer surface 21b'. Each of the opposite ends 21a'' of the front plate body 21' may be configured such that the corresponding first vertical side frame 214' protrudes in both directions.

The first horizontal frames 211' are the horizontal surfaces that are provided on the upper and lower edges of the front plate body 21' and protrude in the direction away from the battery cell 10. When the front case plate 20' is coupled to the rear case plate 30' with the battery cell 10 disposed therebetween, the first horizontal frames 211' are seated onto the inner surface 31b' of the rear case plate 30' and are brought into close contact with inner surfaces of the second horizontal frame 311' which will be explained later, so that the front case plate 20' is fitted into the rear case plate 30'.

The first vertical side frames 214' are the vertical surfaces which are provided on the opposite ends 21a'' of the front plate body 21'. The first vertical side frames 214' protrude in the direction away from the battery cell 10. Each first vertical side frame 214' that extends in the vertical direction between the first horizontal frames 211' has an inclined edge 214a' formed at each of upper and lower portions thereof, and a stepped portion 214b' which connects the inclined edges 214a' to each other.

The first locking depressions 212' are formed by cutting off portions of the upper end of the front plate body 21'. The second locking depressions 213' are formed by cutting off portions of the first horizontal frame 211' of the front plate body 21'. Locking members 312' and lower stoppers 313' of the rear case plate 30' which will be explained later are locked into the corresponding first locking depressions 212' and the corresponding second locking depressions 213' so that the front case plate 20' that is seated onto the inner surface of the rear case plate 30' is fastened to the rear case plate 30'.

Each of the first locking depressions 212' that are formed in the first horizontal frame 211' of the front plate body 21' has a stop portion 212a' that is formed at a position corresponding to the upper end of the front plate body 21', so that the locking member 312' which will be described later is locked to the stop portion 212'.

The first heat dissipation window 22' is an opening which is formed in a central portion of the front case plate 20' to dissipate heat generated from the battery charging part 13 of the battery cell 10.

The front case plate 20' further includes a first partition 215' which is provided around the first heat dissipation window 22' and protrudes from the outer surface 21b' of the front plate body 21'.

The first partition 215' in the vertical direction on the front plate body 21' that has the first heat dissipation window 22', is equal to or shorter than the distance between the upper and lower ends of the first heat dissipation window 22'. For example, the first partition 215' may be formed such that it is aligned with the first vertical side frames 214' so that the first partition 215', the first vertical side frames 214' and second vertical side frames 314' which will be explained later form an aligned stepped shape. Thereby, a passage can be defined between the battery cell provided with the coupled front and rear case plates and another adjacent battery cell.

The first support bar 23' is vertically provided between upper and lower ends of the first heat dissipation window 22' and supports the battery cell 10 disposed between the front case plate 20' and the rear case plate 30'. The first support bar 23' is provided between planar surfaces that form the upper and lower ends of the first heat dissipation window 22'. In detail, the first support bar 23' is provided on the upper surface of the first partition 215' that horizontally extends along the lower end of the first heat dissipation window, and the first support bar 23' is disposed on an edge of the upper surface of the first partition 215' that is on the side away from the battery cell 10. Thereby, a space is defined between the battery cell 10 and the first support bar 23'

The first tab guides 24' protrude from the front plate body 21' upwards and guide the battery tabs 11 of the battery cell 10. In this embodiment, the first tab guides 24' are provided on the upper surface of the first horizontal frame 211', and each first tab guide 24' has an 'L' shape and includes a horizontal plate 241' and a vertical plate 242' that is bent from the horizontal plate 241' and protrudes upwards therefrom.

The rear case plate 30' includes a rear plate body 31', a second heat dissipation window 32', a second support bar 33', connection units 40', circuit board support protrusions 35' and second tab guides 34'. The rear plate body 31' is placed upright and includes the inner surface 31$b$' to which the battery cell 10 is supported, and an outer surface 31$a$' to which the front case plate of another battery cell 10 is coupled. The second heat dissipation window 32' is an opening that is formed in the rear plate body 31'. The second support bar 33' is vertically provided in the second heat dissipation window 32' to support the battery cell 10. The connection units 40' are used to connect the battery cell case to other battery cell cases. The circuit board support protrusions 35' support a circuit board 50' which is placed on the upper end of the battery cell case. The second tab guides 34' guide the corresponding battery tabs.

The rear plate body 31' includes second horizontal frames 311', second vertical side frames 314', the locking members 312' and a second partition 315'. The second horizontal frames 311' horizontally extend along upper and lower edges of the rear plate body 31' and protrude in a direction toward the battery cell 10 to form horizontal plates. The second vertical side frames 314' vertically extend from the opposite ends of the upper second horizontal frame 311' to the lower second horizontal frame 311'. The locking members 312' are locked into the corresponding first locking depressions 212' of the front case plate 20'. The second partition 315' is provided around the second heat dissipation window 32' of the rear plate body 31' and protrudes from the rear plate body 31' in a direction away from the battery cell 10.

The second horizontal frames 311' are the horizontal surfaces that are provided on the upper and lower edges of the rear case plate 30' and protrude from the rear case plate 30' forwards and rearwards. When the front case plate 20' is seated onto the inner surface 31$b$' of the rear case plate 30', the first horizontal frames 211' are brought into close contact with the inner surfaces of the second horizontal frames 311' so that the front case plate 20' is fitted into the rear case plate 30'.

The second vertical side frames 314' vertically extend from the opposite ends of the second horizontal frames 311' of the rear plate body 31' so that the upper and lower second horizontal frames 311' are connected to each other. Each second vertical side frame 314' includes has an inclined edge 314$a$' formed at each of upper and lower portions thereof, and a stepped portion 314$b$' which connects the inclined edges 314$a$' to each other. The shape of the stepped portion of the second vertical side frame 314' may correspond to those of the associated first vertical side frame 214' and first partition 215'.

The second partition 315' is provided on the upper, lower, left and right ends of the second heat dissipation window 32' and protrudes from the outer surface 31$a$' of the rear plate body 31' in the direction away from the battery cell 10. Each of vertical portions of the second partition 315' has a stepped portion that corresponds to that of the second vertical side frame 314'.

The second heat dissipation window 32' is an opening that is formed in the rear plate body 31' to dissipate heat generated from the battery cell 10.

The second support bar 33' vertically extends a predetermined length and connects the upper and lower ends of the second partition 315' to each other. The second support bar 33' functions to support the battery cell 10.

Each locking member 312' will be described in detail with reference to FIGS. 10 and 11.

Figure 10:
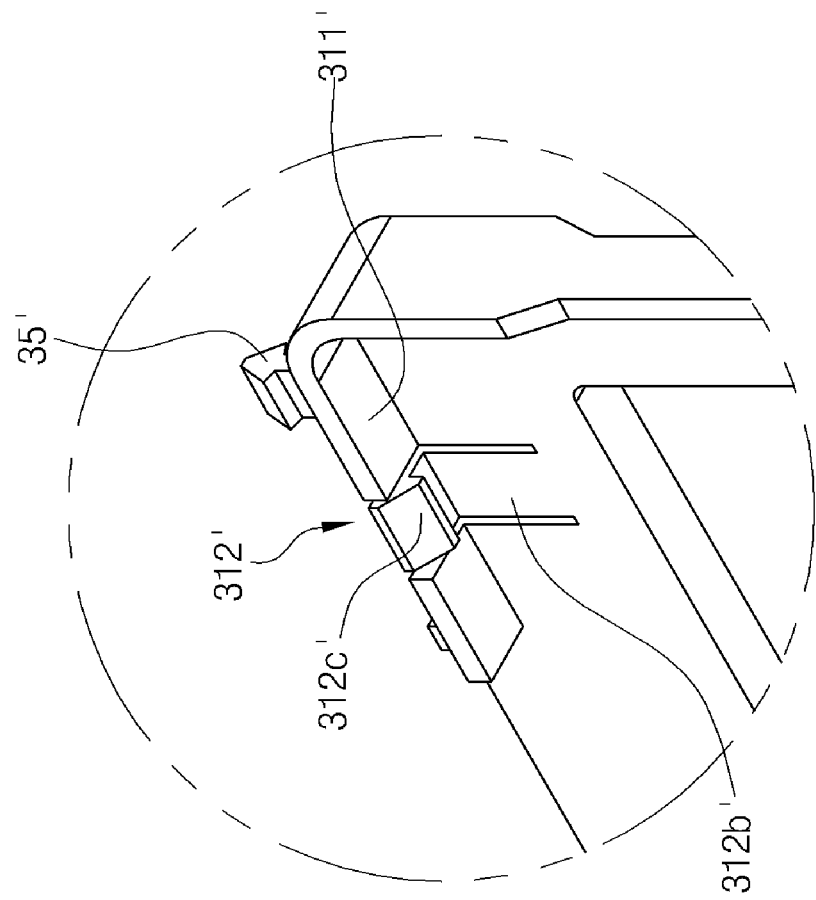
FIG. 10 is an enlarged perspective view of a locking protrusion of the battery cell case according to the second embodiment of the present invention.

FIG. 10 is an enlarged perspective view of the locking member 312' of the battery cell case according to the second embodiment of the present invention. FIG. 11 is a side sectional view of the locking member 312'.

Figure 11:
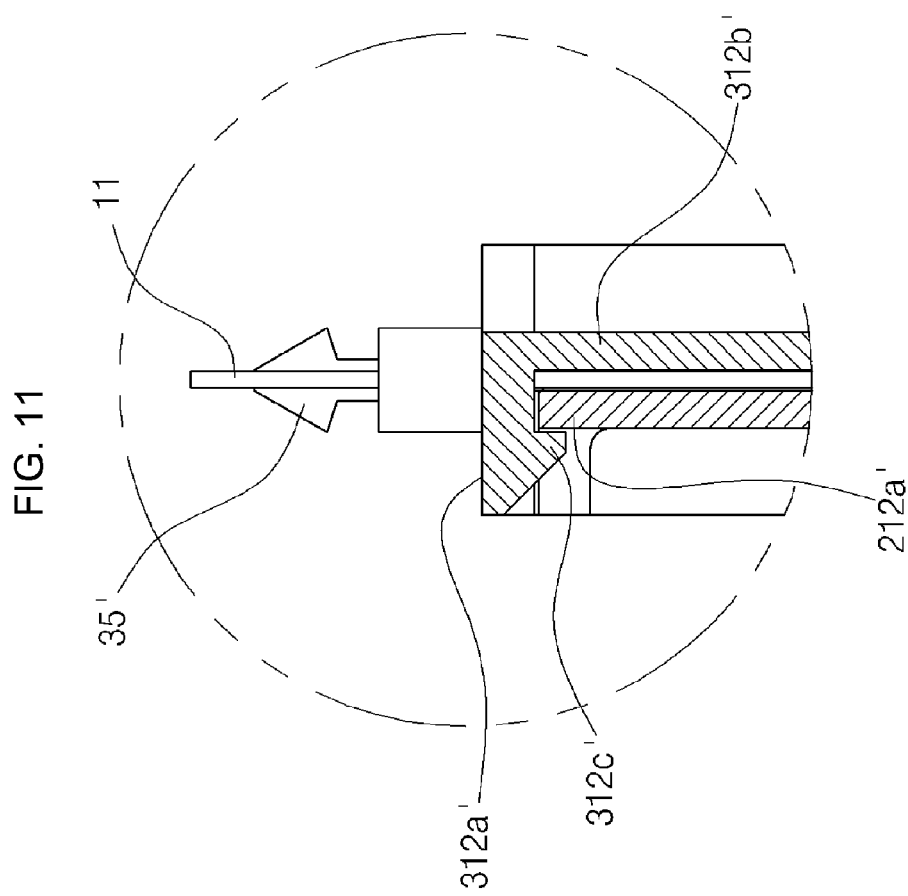
FIG. 11 is a sectional view showing the locking protrusion of the battery cell case according to the second embodiment of the present invention.

Referring to FIGS. 10 and 11, the locking member 312' includes a vertical part 312$b$' which extends from the rear plate body 31', a horizontal part 312$a$' which is bent from the vertical part 312$b$', and a hook 312$c$' which protrudes downwards from the inner surface of the horizontal part 312$a$'.

The vertical part 312$b$' is configured such that a proximal end thereof extends from the rear plate body 31' and opposite side edges thereof are slit from the rear plate body 31'. Therefore, the vertical part 312$b$' can elastically move upwards or downwards on its proximal end that is fixed to the rear plate body 31'.

The horizontal part 312$a$' is bent from an upper end of the vertical part 312$b$'. The horizontal part 312$a$' is separated from the second horizontal frame 311'.

The hook 312$c$' protrudes downwards the inner surface of the horizontal part 312$a$'. The hook 321$c$' has an inclined surface which extends from the end of the horizontal part 312$a$' at a predetermined angle, and a vertical surface which is bent from a lower end of the inclined surface in the vertical direction.

As shown in FIG. 11, the locking member 312' is inserted into the corresponding first locking depression 212' of the first horizontal frame 211' of the front case plate 20', and the hook 312$c$' is locked to the first stop portion 212$a$' of the first locking depression 212' of the front case plate 20', thus fastening the front case plate 20' to the rear case plate 30'.

The rear plate body 31' further includes lower stoppers 313' which protrude upwards from the surface of the second horizontal frame 311' and are seated into the corresponding second locking depressions 213' that are formed in the first horizontal frame 211'. In this embodiment, the lower stoppers 313' are provided on the second horizontal frame 311' at positions spaced apart from each other.

The circuit board support protrusions 35' protrude upwards from the upper end of the rear plate body 31'. A triangular hook is provided on the end of each circuit board support protrusion 35'.

Each second tab guide 34' will be explained in detail with reference to FIG. 12.

Figure 12:
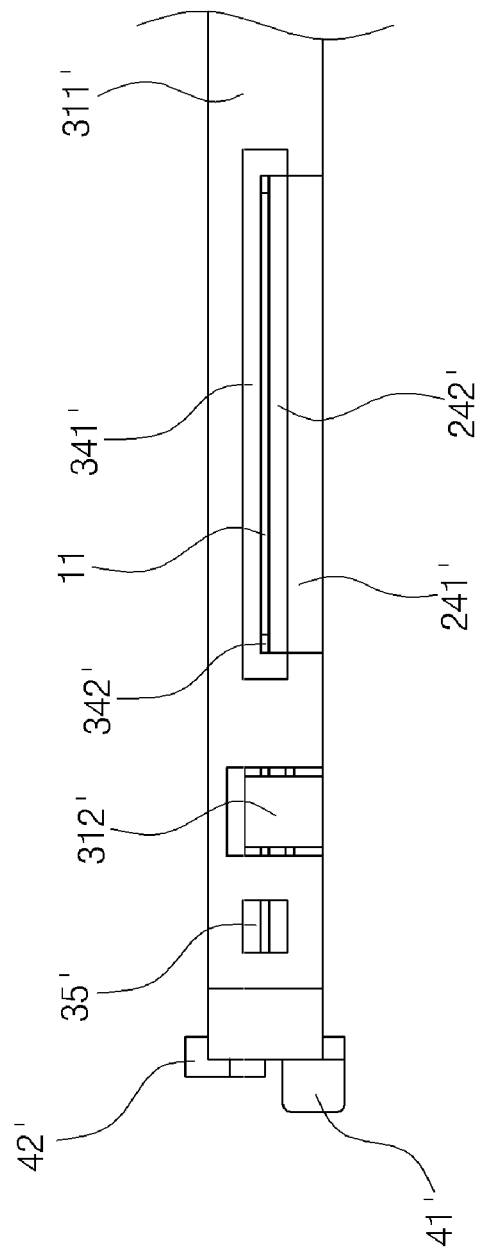
FIG. 12 is a plan view showing a first tab guide and a second tab guide of the battery cell case according to the second embodiment of the present invention.

FIG. 12 is a plan view showing the first tab guide and the second tab guide according to an embodiment of the present invention.

Referring to FIG. 12, the second tab guide 34' includes a guide insert depression 342' which is formed by cutting off a portion of the second horizontal frame 311' that horizontally extends on the upper end of the rear plate body 31, thus forming a space into which the corresponding first tab guide 24' is inserted. The second tab guide 34' further includes a guide plate 341' that protrudes upwards from a portion of the second horizontal frame 311' that surrounds the guide insert depression 342'.

The guide insert depressions 342' are formed in predetermined portions of the second horizontal frame 311'. Each first tab guide 24' is seated into the corresponding guide insert depression 342'.

The guide plate 341' includes a vertical plate that protrudes upwards from the second horizontal frame 311'. The guide plate 341' has a 'U' shape. That is, the opposite ends of the guide plate 341' are bent around the guide insert depression 342', thus forming the 'U' shape which surrounds the guide insert depression 342'.

When the first tab guide 24' is seated into the guide insert depression 342', a space through which the battery tab 11 can protrude upwards is defined between the vertical plate 242' of the first tab guide 24' and the guide plate 341'.

The connection units 40' are respectively provided on the opposite second vertical side frames 314'. Each connection unit 40' includes an insert hook unit 41' which is inserted into another battery cell case, and a catch unit 42' into which an insert hook unit 41' of another battery cell case is inserted. The connection unit 40' will be explained in detail with reference to FIG. 13.

Figure 13:
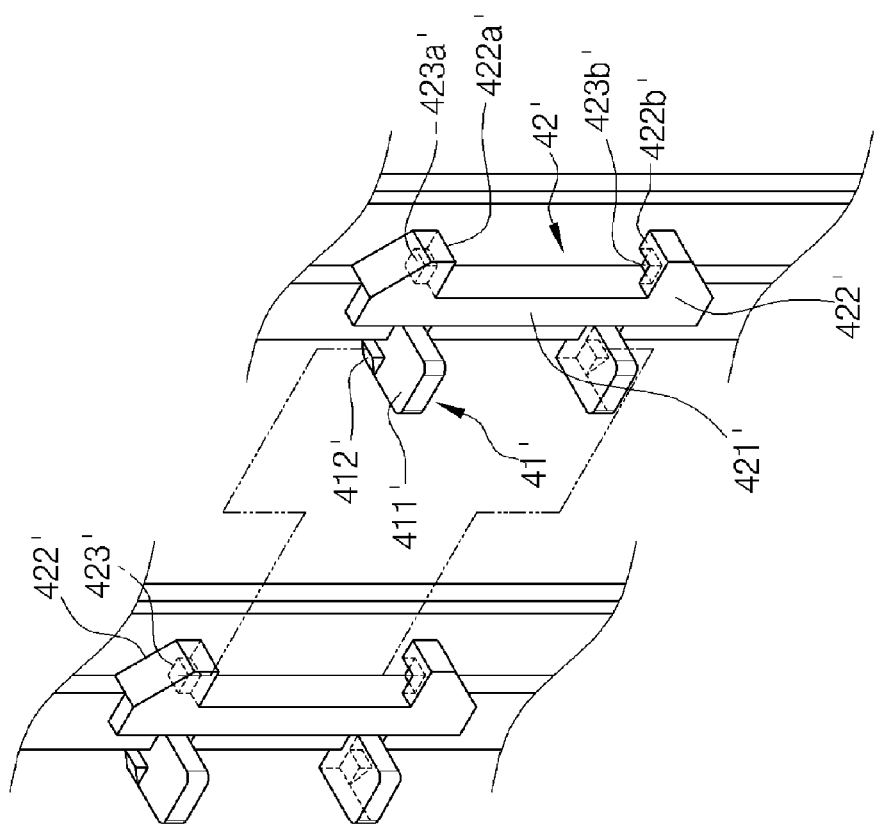
FIGS. 13 and 14 are views showing a connection unit of the battery cell case according to the second embodiment of the present invention.

FIG. 13 is an enlarged view showing the connection unit 40' of the battery cell case according to an embodiment of the present invention.

Referring to FIG. 13, the insert hook unit 41' includes a pair of support plates 411' which are spaced apart from each other with respect to the vertical direction by a predetermined distance, and locking hooks 412' which respectively protrude from an upper surface of the upper support plate 411' and from a lower surface of the lower support plate 411'. Each locking hook 412' has an inclined surface.

The support plates 411' include a first support plate 411' and a second support plate 411' which are provided on the outer surface of the second vertical side frame 314' at positions spaced apart from each other in the vertical direction by a predetermined distance. In this embodiment, the same reference numeral 411' is used to designate the first support plate and the second support plate. A first locking hook and a second locking hook which will be described below are designated by the same reference numeral 412'.

The locking hooks 412' include the first locking hook 412' which protrudes upwards from the upper surface of the upper first support plate 411' and has an inclined surface thereon, and the second locking hook 412' which protrudes downwards from the lower surface of the lower second support plate 411' and also has an inclined surface thereon.

The catch unit 42' includes a support bar 421', blocks 422' and locking depressions 423'. The support bar 421' is fixed on the outer surface of the second vertical side frame 314' and extends a predetermined length in the vertical direction. The blocks 422' protrude from upper and lower ends of the support bar 421' in a direction toward the insert hook unit 41' of an adjacent battery cell case. The locking depressions 423' are formed in opposing horizontal surfaces of the respective blocks 422'.

The support bar 421' extends in the vertical direction and is fixed on the outer surface of the second vertical side frame 314'. The support bar 421' is disposed at a position spaced apart from the insert hook unit 41' by a predetermined distance.

The blocks 422' extend from the upper and lower ends of the support bar 421' in the direction toward the insert hook unit 41' of another adjacent battery cell case. In this embodiment, the blocks 422' include a first block 422a' which protrudes from the upper end of the support bar 421' and has a planar lower surface, and a second block 422b' which protrudes from the lower end of the support bar 421' and has a planar upper surface.

The locking depressions 423' are formed in the planar surfaces of the respective blocks 422' so that when the insert hook unit 41' of the adjacent battery cell case is inserted between the blocks 422', the first locking hook 412' and the second locking hook 412' of the adjacent battery cell case are locked into the corresponding locking depressions 423'.

In this embodiment, the locking depressions 423' include a first locking depression 423a' which is formed in the lower surface of the first block 422a' so that the first locking hook 412' is locked into the first locking depression 423a', and a second locking depression 423c which is formed in the upper surface of the second block 422b' so that the second locking hook 412' is locked into the second locking depression 423c.

Figure 14:
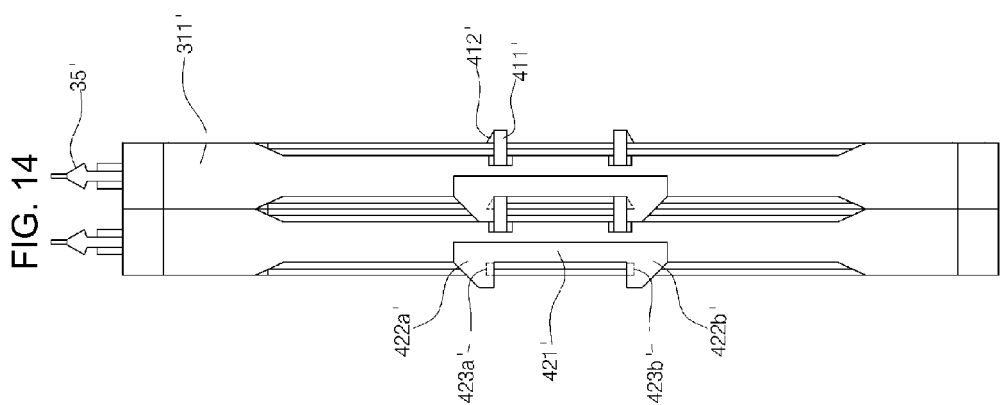

Hereinafter, the operation of the second embodiment of the present invention having the above-mentioned construction will be explained in detail with reference to FIGS. 14 and 15.

First, the battery cell 10 is placed in the inner surface 31b' of the rear case plate 30'. The battery charging part 13 of the battery cell 10 is disposed adjacent to the second heat dissipation window 32', and the frame part 12 is brought into close contact with the inner surface 31b' of the rear case plate 30' that surrounds the second heat dissipation window 32'. Further the battery tabs 11 protrude upwards from the upper surface of the second horizontal frame 311' through the corresponding guide insert depressions 342'.

Thereafter, the inner surface 21a' of the front case plate 20' is seated onto the battery cell 10 and the inner surface 31b' of the rear case plate 30'. The battery charging part 13 of the battery cell 10 is exposed to the outside through the first heat dissipation window 22' of the front case plate 20'.

Subsequently the front case plate 20' is further pushed into the rear case plate 30' such that the outer surfaces of the first horizontal frames 211' and the first vertical side frames 214' of the front case plate 20' are fitted into the space between the second horizontal frames 311' and the second vertical side frame 314' of the rear case plate 30'. At this time, the first horizontal frames 211' of the front case plate 20' are brought into close contact with the inner surfaces of the second horizontal frames 311'. The first vertical side frames 214' are brought into close contact with the inner surfaces of the second vertical side frames 314'.

Furthermore, the locking members 312' are locked into the corresponding first locking depressions 212' of the upper first horizontal frame 211' while the front case plate 20' is fitted into the space between the second horizontal frames 311' and the second vertical side frames 314' of the rear case plate 30'. In the process in which each locking member 312' is locked into the corresponding first locking depression 212', the horizontal part 312a' of the locking member 312' can be elastically moved vertically while passing over the horizontal frame 211', because the vertical part 312b' extends from the rear plate body 31' so as to be movable.

Therefore, each locking member 312' can be smoothly elastically hooked to the stop portion 212a' of the corresponding first locking depressions 212'.

In addition, the lower stoppers 313' that protrude from the lower second horizontal frame 311' are locked into the corresponding second locking depressions 213'. As a result, the front case plate 20' is fixed in the rear case plate 30' by the locking members 312' and the lower stoppers 313'.

Here, the first tab guides 24' of the front case plates 20' are inserted into the guide insert depressions 342' of the corresponding second tab guides 34' of the rear case plate 30' so that the spaces through which the batter tabs 11 protrude outwards are defined between the first tab guides 24' and the guide plates 341' and the second tab guides 34'.

The first partition 215', the first vertical side frames 214' and the second vertical side frames 314' form the aligned stepped portions 214*b*' and 215*b*' using the inclined edges 214*a*' and 215*a*' on the opposite ends of the battery cell case. Thereby, a space is defined between adjacent battery cell cases, thus forming an air passage through which heat generated from the battery cells can be dissipated. In the same manner, the second partition 315' and the second vertical side frames 314' that protrude from the outer surface 31*a*' of the rear case plate 30' form the aligned stepped portions 314*b*' and 315*b*' using the inclined edges 314*a*' and 315*a*', thus defining a heat dissipation air passage between the adjacent battery cell cases.

As stated above, in the embodiment of the present invention, the front case plate 20' can be fixed to the rear case plate 30' in such a way that the front case plate 20' is fitted into the inner surface 31*b*' of the rear case plate 30'. Thus, the assembly process is simplified, thereby markedly reducing the working time.

Moreover, a process of disassembling the front and rear case plates 20' and 30' from each other can also be simple. When the worker pushes the ends of the horizontal parts 312*a*' of the locking members 312' upwards, the hooks 312*c*' provided on the lower surfaces of the locking members 312' are removed from the stop portions 212*a*' of the first locking depressions 212' of the front case plate 20'. Then, the front case plate 20' can be easily separated from the inner surface 31*b*' of the rear case plate 30'.

Several battery cell cases each of which is assembled by the above-mentioned process must be coupled to each other such that the battery cells are electrically connected to each other, thus forming a single battery module, before the battery cell cases are installed in the battery pack case 60'. An example of this process will be explained with reference to FIGS. 14 and 15.

Figure 15:
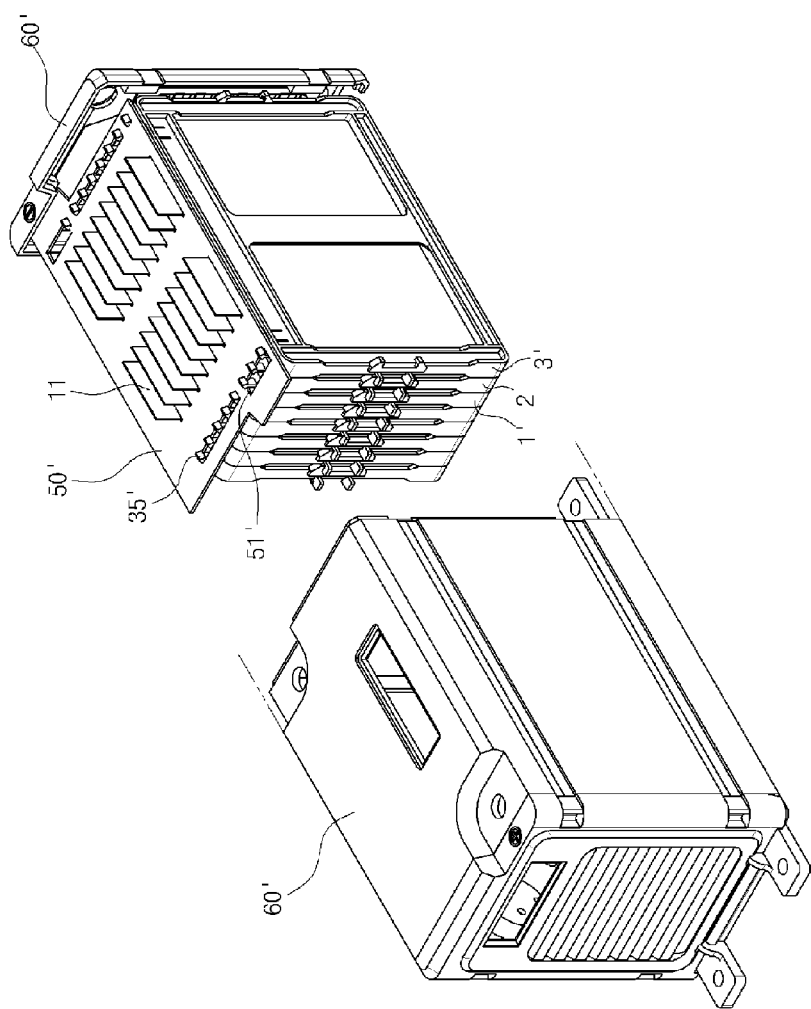
FIG. 15 is a perspective view illustrating use of the battery cell case according to the second embodiment of the present invention.

FIG. 15 is a perspective view illustrating use of the battery cell case according to the second embodiment of the present invention.

Referring to FIG. 15, a first battery cell 1' is coupled to a second battery cell 2' in such a way that the insert hook unit 41' of the second battery cell 2' is locked to the catch unit 42' of the first battery cell 1'. The second battery cell 2' is coupled to a third battery cell 3' in such a way that the insert hook unit 41' of the third battery cell 3' is locked to the catch unit 42' of the second battery cell 2'.

In detail, the first and second locking hooks 412' of the first and second support plates 411' of the second battery cell 2' are inserted between the support bars 421' of the first battery cell 1' and then respectively locked into the first and second locking depressions 423*a*' and 423*b*' of the first battery cell l', thus fastening the first battery cell 1' to the second battery cell 2'.

In the same manner, the first and second locking hooks 412' of the third battery cell 3' are respectively locked into the first and second locking depressions 423*a*' and 423*b*' of the second battery cell 2', thus fastening the second battery cell 2' to the third battery cell 3'. The several battery cell cases are successively coupled to each other in the above-mentioned insert locking manner, thus forming a single battery module.

Thereafter, the battery module that is assembled by the above process is inserted into the battery pack case 60'. Here, a circuit board 50' is disposed on the upper end of the battery module. The circuit board 50' has a circuit, formed thereon, which is electrically connected to an electric circuit board (not shown) and power input and output terminals (not shown) that are installed in the battery pack case 60'. The circuit board 50' has at least one locking hole 51' through which the corresponding circuit board support protrusions 35' can protrude upwards.

The circuit board support protrusions 35' protrude upwards through the locking hole 51' of the circuit board 50' in such a way that the circuit board support protrusions 35' are forcibly fitted into the locking hole 51', thus supporting the circuit board 50'.

As such, the battery cells 1', 2', 3' . . . are successively connected to each other by the connection units 40', thus forming the single battery module. The battery tabs 11 of the connected battery cells are electrically connected to each other by bending them or separate conductors before the battery cell cases are installed in the battery pack case 60'.

In the battery module, the second partition 315' of the first battery cell 1' protrudes towards the outer surface 21*b*' of the front case plate 20' of the second battery cell 2', and the first partition 215' provided on the inner surface 21*a*' of the front case plate 20' of the second battery cell 2' protrudes from the inner surface 31*b*' of the rear case plate 30' of the first battery cell 1'.

Therefore, the first and second battery cells 1' and 2' are coupled to each other in a shape in which the second partition 315' of the first battery cell 1' faces the first partition 215' of the second battery cell 2'. Thereby, a space is defined between the first battery cell 1' and the second battery cell 2'. As such, in the present invention, heat generated from the battery cells 10 can be reliably dissipated through the first and second heat dissipation windows 22' and 32' of the front and rear case plates 20' and 30' and through the air passages defined between the battery cell cases.

As described above, the front case plate 20' and the rear case plate 30' of the battery cell case according to the embodiment of the present invention have structures which are asymmetrical with respect to each other so that their assembly or disassembly can be simplified and the battery cell can be easily cooled by a natural cooling method without using a separate cooling device.

As described above, according to an exemplary embodiment of the present invention, a front case plate and a rear case plate are separably coupled to each other on opposite sides of a battery cell, and the structures of the front and rear case plates are symmetrical structures, so that the battery cell case can be easily assembled in such a way that the front and rear case plates are coupled to each other with the battery cell disposed therebetween and are fastened to each other by holders fitted over the opposite ends of the case plates. According to another exemplary embodiment of the present invention, a front case plate and a rear case plate are separably coupled to each other on opposite sides of a battery cell, and the structures of the front and rear case plates are asymmetrical structures so that the front and rear case plates can be coupled with each other in an insert coupling manner without using a separate tool or fastening means.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A battery cell case, comprising:
   a battery cell, with battery tabs provided on an upper end of the battery cell at positions spaced apart from each other; and
   a front case plate disposed on a front surface of the battery cell, the front case plate comprising first horizontal frames respectively provided on upper and lower ends of the front case plate, each of the first horizontal frames extending in a horizontal direction and forming a horizontal surface; and first vertical side frames forming upright surfaces extending in a vertical direction between opposite ends of the first horizontal frames, and
   a rear case plate disposed on a rear surface of the battery cell, the front and rear case plates being removably coupled to each other, the rear case plate comprising second horizontal frames respectively provided on upper and lower ends of the rear case plate, each of the second horizontal frames extending in a horizontal direction and forming a horizontal surface; and second vertical side frames forming upright surfaces extending in a vertical direction between opposite ends of the second horizontal frames,
   wherein when the front case plate is seated into an inner surface of the rear case plate, outer surfaces of the first horizontal frames are brought into close contact with inner surfaces of the corresponding second horizontal frames, and outer surfaces of the first vertical side frames are brought into close contact with inner surfaces of the corresponding second vertical side frames such that the front case plate is fitted into the rear case plate; and
   the rear case plate comprises:
      an insert hook unit comprising: a pair of support plates provided on an outer surface of each of the second vertical side frames at positions spaced apart from each other with respect to the vertical direction by a predetermined distance; and a locking hook provided on an upper or lower surface of each of the support plates; and
      a catch unit comprising: a support bar provided on the outer surface of each of the second vertical side frames, the support bar extending in the vertical direction; a first block protruding from an upper end of the support bar and having a planar surface on a lower end thereof; a second block protruding from a lower end of the support bar and having a planar surface on an upper end thereof; and a locking depression formed in the planar surface of each of the first and second blocks.

2. The battery cell case as set forth in claim 1, wherein the front case plate has at least one first locking depression formed in the first horizontal frame that is provided on the upper end of the front case plate, and
   the rear case plate comprises a locking member provided in the second horizontal frame that is provided on the upper end of the rear case plate, and the locking member has a hook on a lower surface thereof so that the hook of the locking member is locked to the first locking depression.

3. The battery cell case as set forth in claim 1, wherein the front case plate further comprises at least one second locking depression formed in the first horizontal frame that is provided on the lower end of the front case plate and extends in the horizontal direction, and
   the rear case plate further comprises a lower stopper protruding upwards from the horizontal surface of the second horizontal frame that is provided on the lower end of the rear case plate and extends in the horizontal direction, the lower stopper being locked into the second locking depression.

4. The battery cell case as set forth in claim 1, wherein the first vertical side frames and the second vertical side frames have stepped portions having shapes aligned with each other and extending in the vertical direction.

5. The battery cell case as set forth in claim 2, wherein the locking member comprises
   a horizontal surface and a vertical surface each of which is separated at an opposite side edge thereof from the rear case plate, wherein a proximal end of the vertical surface extends from the rear case plate.

6. The battery cell case as set forth in claim 1, wherein the front case plate comprises:
   a front plate body having a planar inner surface with which the battery cell is brought into close contact, and an outer surface on which the first horizontal frames and the first vertical frames are provided;
   a first heat dissipation window formed through the front plate body to dissipate heat generated from the battery cell;
   a first support bar provided in the first heat dissipation window and extending in the vertical direction; and
   first tab guides protruding upwards from an upper surface of the first horizontal frame that is provided on the upper end of the rear case plate, the first tab guides guiding the corresponding battery tabs of the battery cells.

7. The battery cell case as set forth in claim 1, wherein the rear case plate comprises:
   a rear plate body having a planar inner surface with which the battery cell is brought into close contact, with the second horizontal frames and the second vertical frames provided on the inner surface of the rear plate body;
   a second heat dissipation window formed through the rear plate body to dissipate heat generated from the battery cell;
   a second support bar provided in the second heat dissipation window and extending in the vertical direction; and
   second tab guides protruding upwards from an upper surface of the second horizontal frame that is provided on the upper end of the rear case plate, the second tab guides guiding the corresponding battery tabs of the battery cells.

8. The battery cell case as set forth in claim 7, wherein each of the second tab guides comprises:
   a guide insert depression formed in the second horizontal frame that is provided on the upper end of the rear case plate, the guide insert depression having a width corresponding to a width of the corresponding first tab guide; and
   a guide plate protruding upwards from a portion of the upper surface of the second horizontal frame that surrounds the guide insert depression.

9. The battery cell case as set forth in claim 8, wherein opposite ends of the guide plate are bent around the guide insert depression.

10. The battery cell case as set forth in claim 1, wherein the front case plate further comprises
    a first partition provided on each of opposite ends of the outer surface of the battery cell that is not brought into contact with the battery cell, the first partition extending a predetermined length in the vertical direction and having a stepped portion aligned with the stepped portion of the corresponding first vertical side frame.

11. The battery cell case as set forth in claim 1, wherein the rear case plate further comprises a rear partition provided on each of opposite ends of the outer surface of the battery cell that is not brought into contact with the battery cell, the rear partition extending a predetermined length in the vertical direction and having a stepped portion aligned with the stepped portion of the corresponding second vertical side frame.

12. The battery cell case as set forth in claim 1, wherein the rear case plate further comprises a circuit board support protrusion protruding upwards from the upper end of the rear case plate to support a circuit board.

\* \* \* \* \*